(12) United States Patent
Lee

(10) Patent No.: US 8,897,761 B2
(45) Date of Patent: Nov. 25, 2014

(54) SYSTEMS AND METHODS FOR MOBILE COMMUNICATIONS

(71) Applicant: Intellectual Discovery Co., Ltd., Seoul (KR)

(72) Inventor: Chulhee Lee, Gyounggi-Do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/741,528

(22) Filed: Jan. 15, 2013

(65) Prior Publication Data
US 2013/0137409 A1    May 30, 2013

Related U.S. Application Data

(63) Continuation of application No. 10/419,830, filed on Apr. 22, 2003, now abandoned.

(51) Int. Cl.
| | | |
|---|---|---|
| H04W 60/00 | (2009.01) | |
| H04M 1/00 | (2006.01) | |
| H04M 1/60 | (2006.01) | |
| H04M 1/663 | (2006.01) | |
| H04M 1/673 | (2006.01) | |
| H04M 1/725 | (2006.01) | |
| H04W 4/16 | (2009.01) | |
| H04W 84/04 | (2009.01) | |

(52) U.S. Cl.
CPC .............. *H04W 60/00* (2013.01); *H04M 1/006* (2013.01); *H04M 1/6075* (2013.01); *H04M 1/663* (2013.01); *H04M 1/673* (2013.01); *H04M 1/72519* (2013.01); *H04W 4/16* (2013.01); *H04W 84/042* (2013.01)
USPC ....................................... 455/417; 455/552.1

(58) Field of Classification Search
USPC .............. 455/552.1, 403, 415, 417, 445, 446; 370/352; 379/211–212, 201.01, 142.07
See application file for complete search history.

(56) References Cited

U.S. PATENT DOCUMENTS

| | | | |
|---|---|---|---|
| 5,825,864 A | | 10/1998 | McGraw et al. |
| 6,708,028 B1 | * | 3/2004 | Byrne .......................... 455/426.1 |
| 6,738,466 B1 | * | 5/2004 | LaPierre et al. .......... 379/211.02 |
| 6,834,106 B1 | | 12/2004 | Pinard |
| 8,792,828 B2 | * | 7/2014 | Mauney et al. ............... 455/41.2 |
| 2001/0041560 A1 | | 11/2001 | Tarkiainen et al. |
| 2002/0177410 A1 | * | 11/2002 | Klein et al. ...................... 455/41 |
| 2003/0022660 A1 | * | 1/2003 | Payne et al. .................... 455/417 |
| 2003/0092451 A1 | * | 5/2003 | Holloway et al. .............. 455/461 |
| 2003/0119495 A1 | * | 6/2003 | Hanninen et al. .............. 455/422 |
| 2003/0186676 A1 | | 10/2003 | Ogman et al. |
| 2004/0067749 A1 | * | 4/2004 | Bottrich et al. ................ 455/410 |

FOREIGN PATENT DOCUMENTS

KR    1019990045971 A    6/1999

* cited by examiner

*Primary Examiner* — William Deane, Jr.
(74) *Attorney, Agent, or Firm* — Husch Blackwell LLP

(57) ABSTRACT

Methods and systems for mobile communications are provided, which provide a hands-free mobile communication when one is driving, particularly without the driver having to take out the mobile terminal and place it in the holder of a hands-free system and connect a cord. The methods and systems for mobile communications can support a plurality of users. The automobile mobile terminal is also used to perform other useful functions.

29 Claims, 27 Drawing Sheets

(a)

> Cancel redirecting my communications (YYY-YYY-YYYY) through XXX-XXX-XXXX.

(b)

> Cancel redirecting my communications (YYY-YYY-YYYY) through XXX-XXX-XXXX and never do it again today.

(c)

> Cancel redirecting my communications (YYY-YYY-YYYY) through XXX-XXX-XXXX and never do it again until I request.

(d)

> Cancel redirecting.

Fig. 7.

00: YYY-YYY-YYY1
01: YYY-YYY-YYY2
10: YYY-YYY-YYY3
11: YYY-YYY-YYY4

Redirect all my commu-
nication (YYY-YYY-YYYY)
to XXX-XXX-XXXX.

(b)

Redirect only incoming
calls (YYY-YYY-YYYY) to
XXX-XXX-XXXX.

(c)

Redirect all my
communication.

(d)

Redirect only incoming
calls.

Redirect all my commu-
nication (YYY-YYY-YYYY)
to XXX-XXX-XXXX.

(b)

Redirect and duplicate
all my communication
(YYY-YYY-YYYY) to XXX-
XXX-XXXX.

(c)

Redirect all my
communication.

(d)

Duplicate all my
communication.

Termination Conditions
1. absence of signals
2. cancellation message
3. making a call
4. receiving a call (b)

Termination Conditions
1. absence of signals (c)

Termination Conditions
1. absence of signals
2. cancellation message

Fig. 27.

SYSTEMS AND METHODS FOR MOBILE COMMUNICATIONS

CROSS-REFERENCE TO RELATED APPLICATION

This application is a continuation application of U.S. patent application Ser. No. 10/419,830, filed Apr. 22, 2003, the entire contents of which are hereby incorporated by reference.

BACKGROUND OF THE INVENTION

1. Field of the Invention

This invention relates to methods and systems for mobile communication. In particular, it relates to methods and systems for mobile communication systems that enable a user to make and receive a call without using the hand.

2. Description of the Related Art

Recently, mobile phones have become widely available. Mobile communication provides convenience and mobility. However, a problem with the mobile phone is that it is difficult to use while driving an automobile. In particular, if the phone is in a bag or in a pocket, it is difficult to make or receive a call while driving an automobile. In order to address this problem, many manufacturers are providing so-called hands-free systems. In a typical hands-free system, the user should place the mobile phone in the holder of the hands-free system and connect a cord. Then, the user can make or receive a call through the microphone and speaker of the hands-free system without holding the phone to his or her ear and mouth. However, it is rather inconvenient to take out the mobile phone, place it in the holder and connect a cord each time the driver gets into the automobile. Quite often, the driver forgets to place the mobile phone in the holder. Sometimes, the driver forgets to take out the mobile phone when leaving the automobile.

Thus, there is a need for methods and systems for mobile communications, which provide a true hands-free mobile communication system when one gets into an automobile and drives the automobile, without placing the mobile phone in the holder of the hands-free system and connecting a cord.

SUMMARY OF THE INVENTION

Thus, it is an object of the present invention to provide methods and systems for mobile communications, which provide a true hands-free mobile communication when one is driving an automobile, particularly without the driver having to take out the mobile phone, place it in the holder of a hands-free system and connect a cord.

It is another object of the present invention to provide methods and systems for mobile communications, which can support a plurality of users.

The other objects, features and advantages of the present invention will be apparent from the following detailed description.

BRIEF DESCRIPTION OF THE DRAWING

FIG. 7 shows various examples of cancellation textual messages.

FIG. 13 illustrates code assignment for four telephone numbers.

FIG. 25 shows examples of textual messages which direct the telephone company system what types of incoming communication should be redirected to the automobile mobile phone.

FIG. 26 shows examples of textual messages which direct the telephone company system whether incoming communication should be redirected or duplicated to the automobile mobile phone.

FIG. 27 shows examples of textual messages which direct the telephone company system what types of termination conditions should be used.

DESCRIPTION OF THE ILLUSTRATED EMBODIMENT

Figure 1:
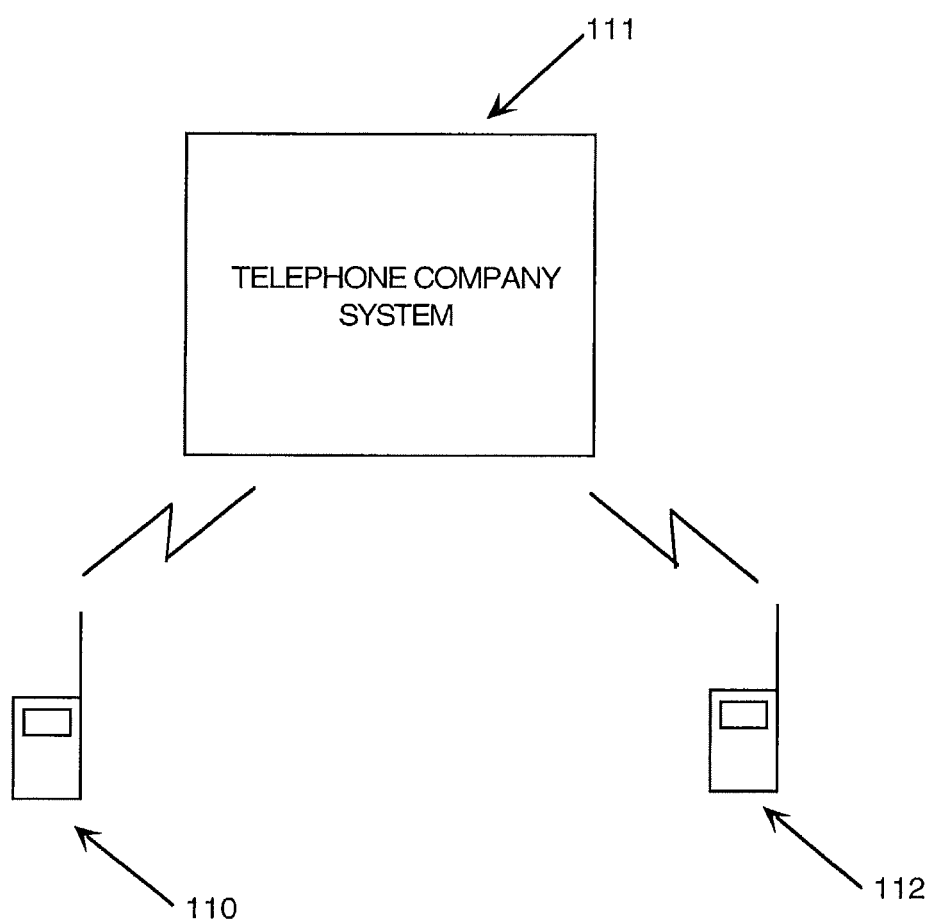
FIG. 1 shows a block diagram of a mobile communication system.
Figure 2:
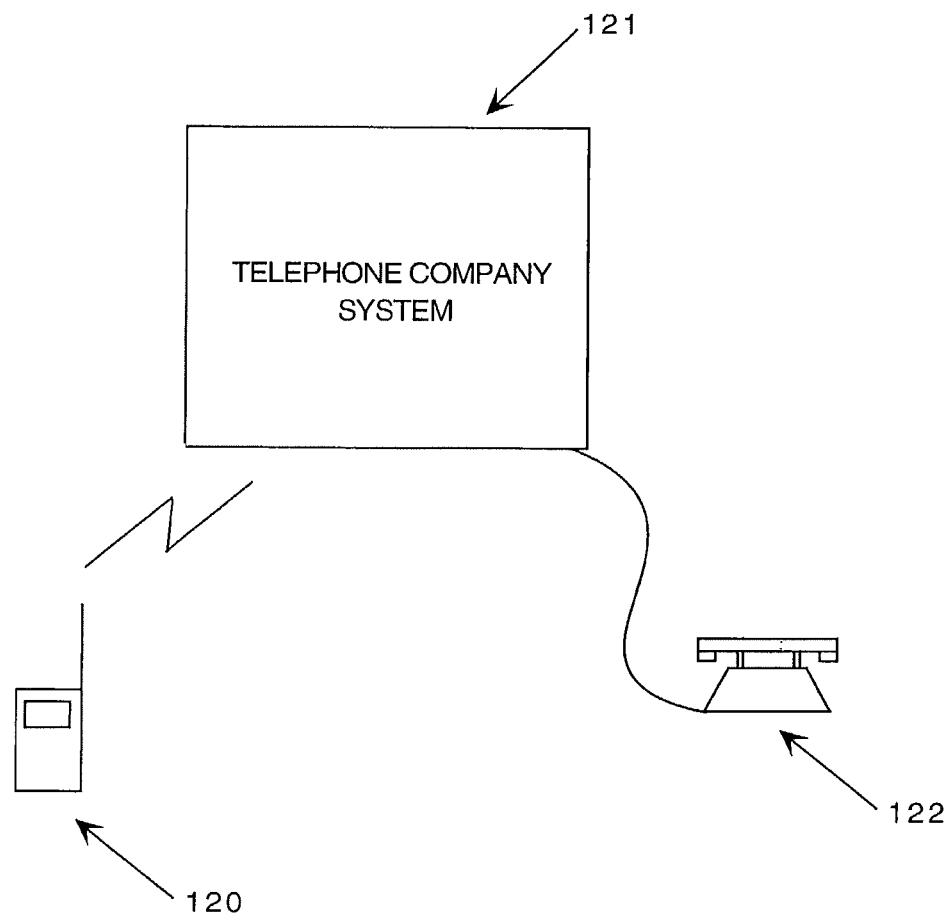
FIG. 2 shows another block diagram of a mobile communication system.

There are a number of different mobile communication systems, which includes cellular phones and mobile phones using satellites. There are also a number of different technologies to implement mobile communications such as CDMA, GSM, and IMT-2000. It is noted that the idea and teaching of the present invention can be used for any kind of systems and types of mobile communication technologies. Although the working mechanism of mobile communications is quite complicated, the general block-diagram is illustrated in FIG. 1. The mobile phone 110 is connected to another phone, which may be a mobile phone 111 or any other type of phone system, through the telephone company system 112. For instance, the mobile phone 120 may be connected to a wired phone 122 through the telephone company system 121 (FIG. 2).

Figure 3:
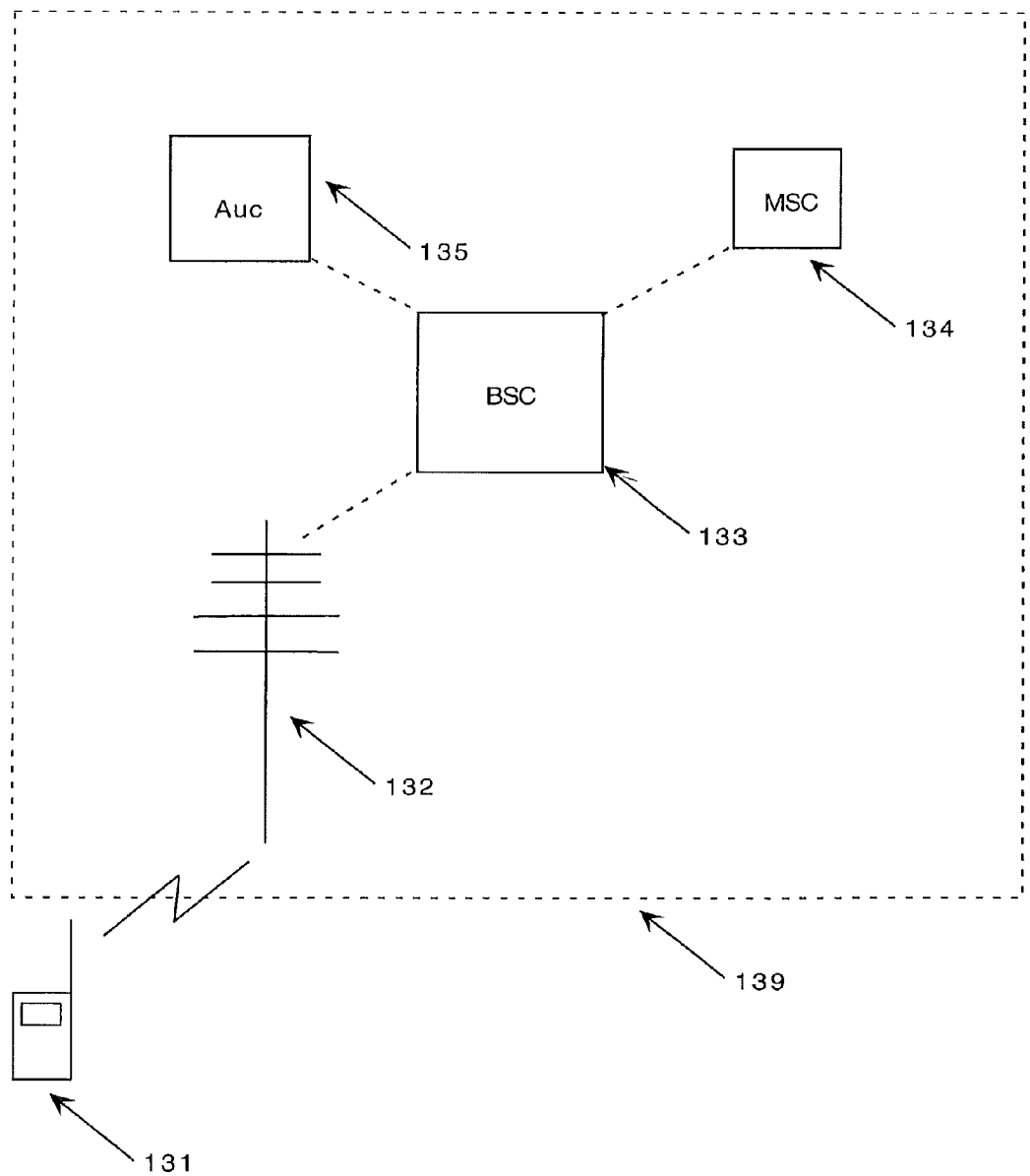
FIG. 3 shows a more detailed block diagram of a mobile communication system.

The actual systems inside the telephone company system 139 can be very complicated. In fact, they consist of a number of sub-systems. For instance, as illustrated in FIG. 3, it may include base stations 132, base stations controllers 133, mobile switching centerscentres 134, and authentication centers 135. Since the detailed implementation of mobile communication systems do not affect the idea of and teaching of the present invention, the terminology "telephone company system" will be used to indicate all the systems that are required to connect a mobile phone user to another user who may use a mobile phone or any other type of phone system.

Figure 5:
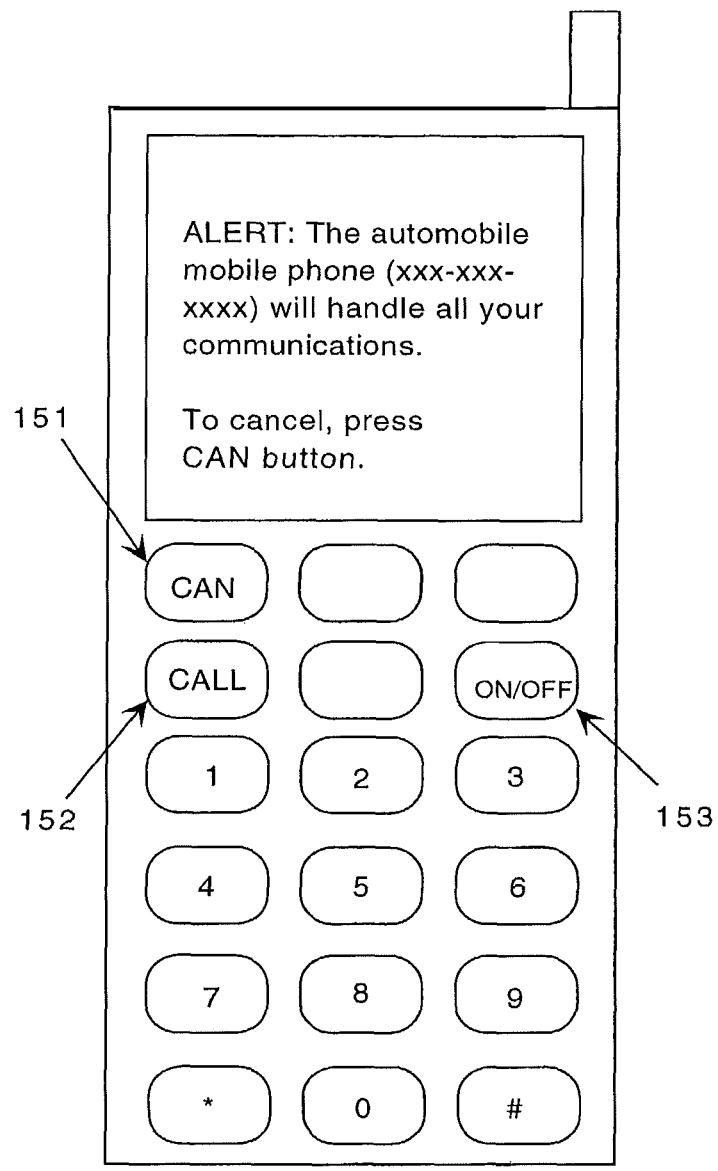
FIG. 5 shows an example of a textual message, which alerts a registered user that the automobile mobile phone will handle all the communications of the registered user.

In a typical mobile communication system, when the mobile phone is turned on, it is usually said that the mobile phone is in stand-by mode. While the mobile phone is in stand-by mode, the mobile phone continues to send signals to the company system. In this stand-by mode, the user can make or receive calls. When there is an incoming call, the mobile phone rings and the user can answer the call by pressing a certain button. In some models such as a folder type mobile phone, the user can answer the incoming call by opening the folder. When the mobile phone is turned off (power-off state), the mobile phone stops sending signals to the telephone company system. In a typical mobile phone, the mobile phone can be turned on or off by pressing the on/off button 153 (FIG. 5).

Embodiment 1

Recently, mobile phones have been widely used due to their convenience and mobility. Nevertheless, a problem with the mobile phone is that it is difficult to use while driving an automobile. When one is driving, his or her hands are occupied with the steering wheel, as well as signaling. In particular, if the phone is in a bag or in a pocket, it is difficult to make or receive a call while one is driving. In order to address this problem, many manufacturers are providing so-called hands-free systems. In a typical hands-free system, the user should place the mobile phone in the holder of the hands-free system and connect a cord. Then, the user can make or receive a call through the microphone and speaker of the hands-free system without holding the phone to his or her ear and mouth. Some hands-free systems use the automobile's sound system. However, it is rather inconvenient to take out the mobile phone and place it in the holder and connect a cord each time the driver gets into the automobile. Quite often, the driver forgets to place the mobile phone in the holder. Sometimes, the driver forgets to take the mobile phone out when the driver leaves the automobile.

In order to solve this problem, according to the teaching and idea of the present invention, another mobile phone is provided in the automobile. In other words, the user is provided two mobile phones: one carried by the user (personal mobile phone) and the other (automobile mobile phone) installed in the automobile. It is noted that in the present invention, the terminology, "personal mobile phone" or "personal mobile terminal", is used to indicate the mobile phone or terminal that is actually carried by a user. It can be also a PDA or any other type of mobile terminal. The terminology, "automobile mobile phone" or "automobile mobile terminal", is used to indicate the mobile phone or terminal that is installed in the automobile. It can be also a PDA or any other type of mobile terminal. It is also noted that the automobile mobile phone may be installed in such a way that it can be removed. In other words, the automobile mobile phone can be taken out and used as a regular mobile phone.

The personal mobile phone and the automobile mobile phone have their own telephone numbers and these two numbers are registered together with the telephone company system. Thus, the telephone company system knows that these two telephone numbers are paired so that one is the telephone number of the personal mobile phone carried by the user and the other is the telephone number of the automobile mobile phone installed in the automobile, which is operated by the user. Usually, the automobile mobile phone is connected to an external microphone and an external speaker. The external speaker can be an automobile speaker. Furthermore, the automobile mobile phone is designed to be turned off when the automobile is not operated. Since mobile phones continually exchanges signals with the telephone company system in most mobile communication systems, the telephone company system knows that the automobile mobile phone is turned off if it does not receive any signal from the automobile mobile phone. Furthermore, according to the idea and teaching of the present invention, the automobile mobile phone is designed to be automatically turned on when the automobile is started. Thus, the absence of signals from the automobile mobile phone indicates that the automobile is not being used.

When the automobile mobile phone is turned on, it begins sending signals to the telephone company system. When the telephone company system receives signals from the automobile mobile phone, it assumes that the user is driving the automobile and redirects all communications of the personal mobile phone carried by the user to the automobile mobile phone. In other words, when the automobile mobile phone is turned on and begins sending signals to the telephone company system, the telephone company system redirects all communications of the personal mobile phone to the automobile mobile phone. This redirecting communication is automatically done by the telephone company system while it receives signals from the automobile mobile phone. When the automobile mobile phone is turned off and stops sending signals to the telephone company system, then the telephone company system terminates the redirection. In other words, the telephone company system processes all communications of the user through the personal mobile phone, which is carried by the user.

Figure 4:
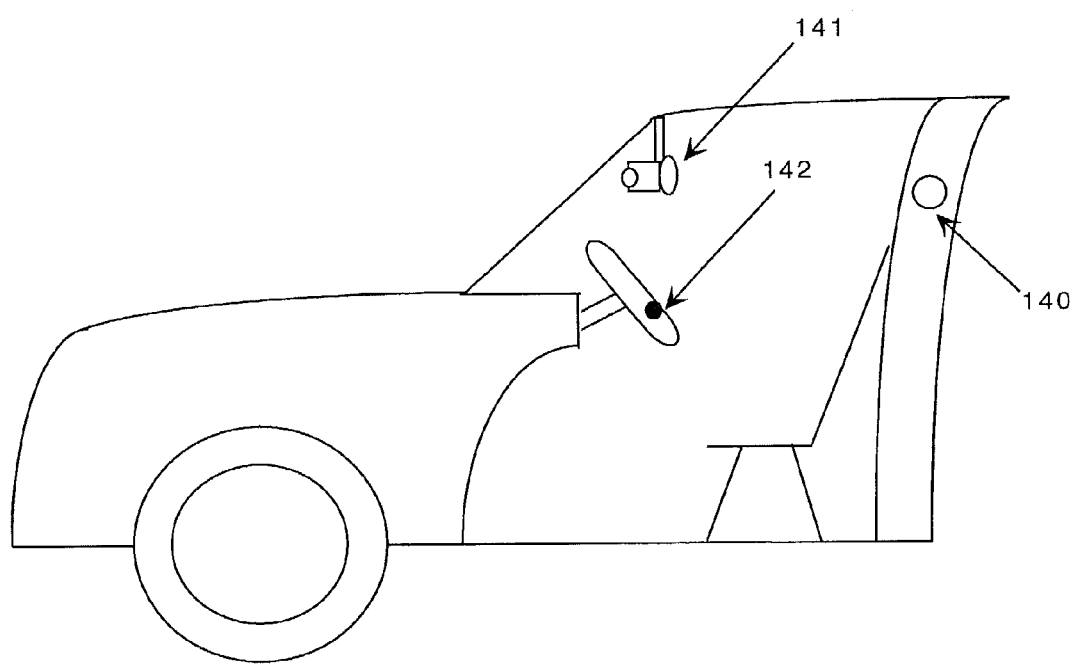
FIG. 4 illustrates the speaker, which is located next to the ear of the driver.

For instance, when someone places a call to the personal mobile phone, the telephone company system redirects the call to the automobile mobile phone while the telephone company system receives signals from the automobile mobile phone. Since the automobile mobile phone is already connected to an external microphone and a speaker, which are conveniently located for the driver's use, the driver can receive a phone call and talk freely without occupying his or her hands. In order to provide privacy when there are passengers in the automobile, the external speaker may be installed in such a way that the sound is audible only to the driver. For instance, a directional external speaker 140 can be located on the bulkhead next to the ear of the driver (FIG. 4) and a microphone 141 is located close to the mouth of the driver. If the automobile mobile phone shares the automobile' sound system, the automobile needs audio signal control means which controls the signals from the automobile mobile phone and other sound sources such as a radio and a CD player.

When the driver wants to make an outgoing call while driving, the driver can use the automobile mobile phone. In order to provide easy access, a call button 142, which is used to answer or make a call, can be installed in a place so that the driver can easily access it while driving. For instance, it can be placed on the steering wheel or on the instrument panel. In addition, an on/off button, which is used to end a call, can also be placed on the steering wheel (FIG. 23) or the instrument panel.

It is possible that someone else may be driving the automobile whose automobile mobile phone is registered to the personal mobile phone of a registered user. For instance, a family member of the registered user may be driving the automobile. In this case, the telephone company system incorrectly redirects communications of the registered user to the automobile mobile phone. In order to prevent this problem, the telephone company system may send a textual message to the personal mobile phone carried by the registered user, alerting the registered user that the automobile mobile phone will handle all communications of the registered user. Furthermore, the telephone company system also provides an option for the registered user to cancel the communication redirection. If the registered user exercises the cancellation option, the telephone company system cancels the communication redirection and handles all communications of the registered user through the personal mobile phone. These alerting and cancellation operations can be done using textual messages, which are already provided by most mobile telephone companies. FIG. 5 shows an example of such a textual message, alerting the registered user that the automobile mobile phone, whose number is XXX-XXX-XXXX, will handle all communications of the registered user. If the registered user wants to cancel the redirection, the registered user should press a specified button 151 to cancel. Then, the personal mobile phone sends a cancellation request and the telephone company system cancels the redirection of communication. As previously described, this cancellation request can be also sent to the telephone company system as a textual message.

Figure 6:
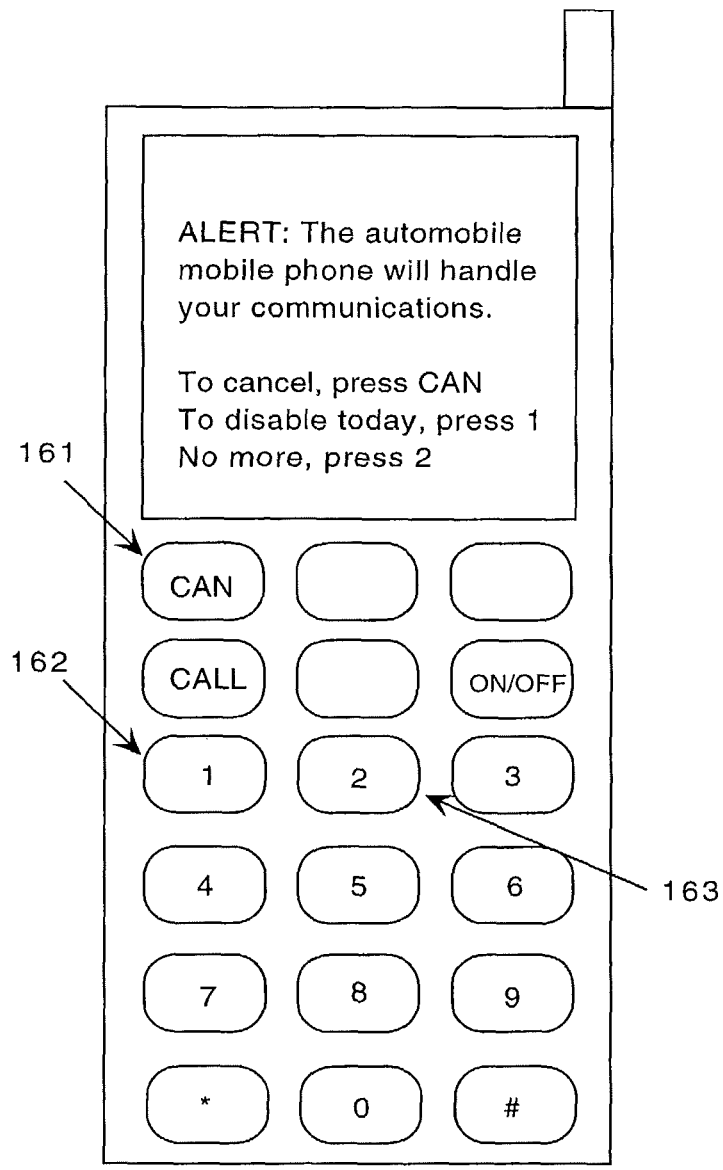
FIG. 6 shows an example of an alerting message with various cancellation options.

Furthermore, the telephone company system can provide various options to the registered user so that no more communication redirection is allowed on the day or until the registered user activates the redirection option or for any specified time period (FIG. 6). It is noted that all these kinds of communications can he handled using textual messages, which are already provided by most mobile phone companies. FIG. 7 shows some examples of this cancellation request sent from the personal mobile phone. FIG. 7d shows a simple cancellation request. Since the telephone company system already knows the telephone numbers of the personal mobile phone and the automobile mobile phone, it can easily handle the cancellation request. In FIG. 7a, the textual message specifies the telephone numbers of the personal mobile phone and the automobile mobile phone. In FIG. 7b, the textual message specifies the telephone numbers of the personal mobile phone and the automobile mobile phone and requests no more redirection to the automobile mobile phone (XXX-XXX-XXXX) on the remaining day. FIG. 7c, the textual message specifies the telephone numbers of the personal mobile phone and the automobile mobile phone and requests no more redirection to the automobile mobile phone (XXX-XXX-XXXX) until the user requests again.

There is another possible solution to avoid unwanted communication redirection. For instance, the telephone company system sends ringing signals to both the automobile mobile phone and the personal mobile phone. In other words, all incoming calls directed to the personal mobile phone will be also duplicated to the automobile mobile phone. The incoming call can be answered either from the automobile mobile phone or the personal mobile phone. If the user answers the call from the personal mobile phone, the telephone company system cancels the redirection. In other words, the telephone company system does not send ringing signals to the automobile mobile phone if the user receives the incoming call from the personal mobile phone. In order to provide an adequate response time for the user, the telephone company system may first ring the personal mobile phone and then ring the automobile mobile phone after a predetermined delay. In addition, when the user places a call from the personal mobile phone, the telephone company system also cancels the redirection.

Figure 8:
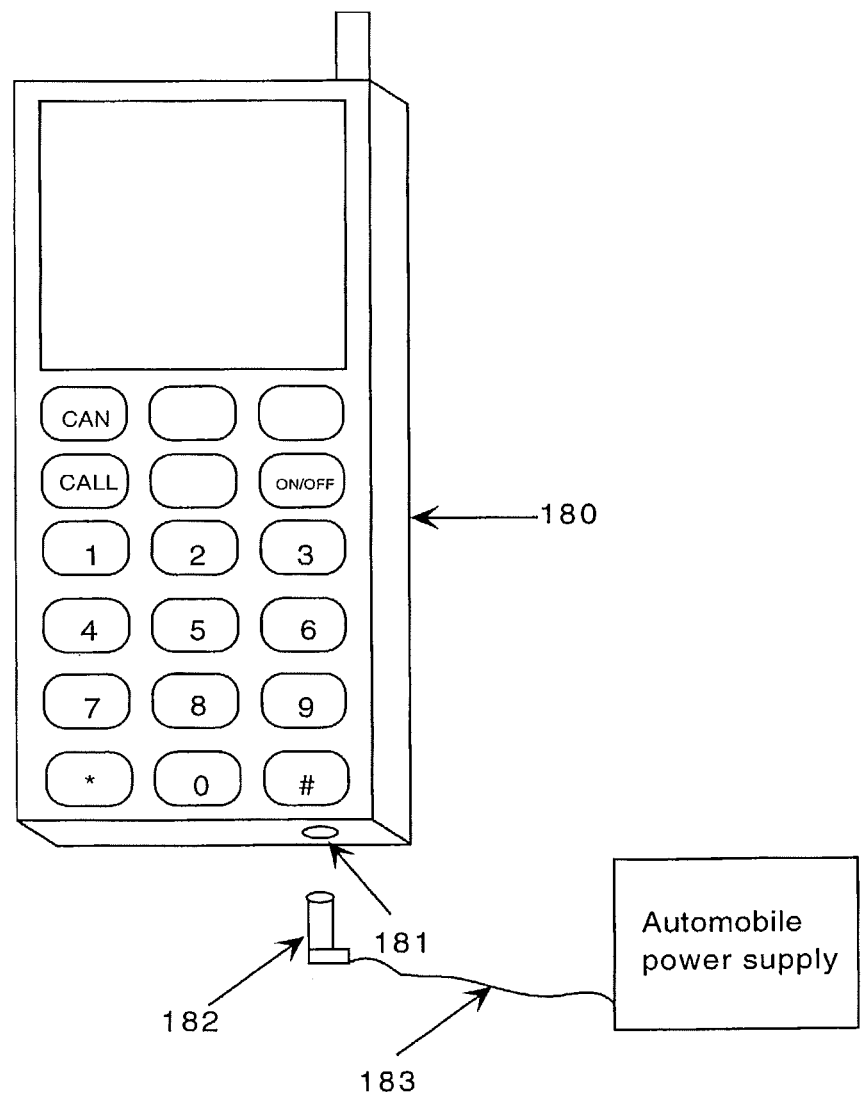
FIG. 8 illustrates an automobile mobile phone and a power cord.

In order to turn off the automobile mobile phone when the automobile is not being operated, the automobile mobile phone 180 is designed to be powered by the automobile power source through a power cord 183 (FIG. 8). When the automobile is not being operated, the power is not supplied to the automobile mobile phone. When the power is not supplied to the automobile mobile phone, the automobile mobile phone stops sending signals to the telephone company system and shuts itself down. Then, the telephone company system knows that the user is not driving the automobile and terminates the redirection of communications. In other words, all communications of the user are handled by the personal mobile phone.

These days, many working mobile phones are abandoned since consumers change their mobile phones for new models which have more functions. These old models can be used as an automobile mobile phone. However, most of these old models, including current models, are designed to operate with a battery. Furthermore, when power is supplied either by a battery or through a cord from a power supply, most old and current models are not automatically turned on. In order to use these old models as an automobile mobile phone, the user needs to manually turn on the automobile mobile phone each time the user gets into the automobile and turn off the phone when the user leaves the automobile. Although the user does not need to connect a cable, it is rather inconvenient.

A possible solution to this problem is to modify the current mobile phone so that it is powered by the automobile power supply through a power cord and is automatically turned on when power is supplied. This modification can be easily made. Although it requires some hardware modifications, there is no technical difficulty. In order to provide compatibility with the present invention, future models of mobile phones can be designed in such a way that when a power cord 183 is connected to the mobile phone 180 and power is supplied, it automatically turns on and sends signals to the telephone company system (FIG. 8). When power is not supplied, the mobile phone is also automatically turned off. It is noted that the mobile phone may have a battery. However, even if the battery is fully charged, the mobile phone will turn itself off if power is not supplied when the power cord 183 is connected. When the power cord 183 is disconnected, the mobile phone works as a conventional mobile phone. The user may use the automobile mobile phone in an emergency or in case that the user forgets to bring his or her personal mobile phone.

Figure 18:
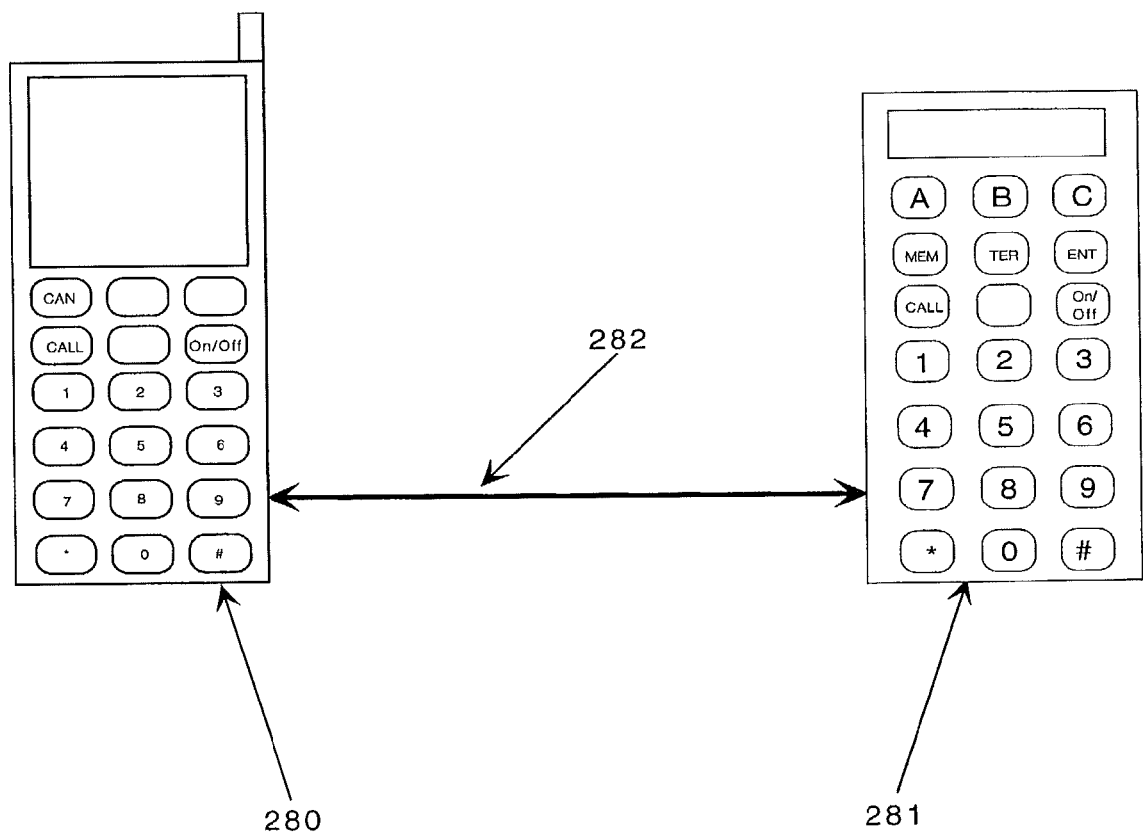
FIG. 18 illustrates the connection between the automobile mobile phone and the input panel.

Furthermore, since the automobile mobile phone may not be easily accessible to the driver, the automobile mobile phone needs to be remotely manipulated. Since most mobile phones are already equipped with interface means, the automobile mobile phone can be controlled by using the interface means. FIG. 18 illustrates how the automobile mobile phone 280 is connected to an input panel 281 through an interface cable 282 and can be operated using the input panel For instance, the driver can dial using the input panel 281 and the input panel 281 sends this dialing information to the automobile mobile phone 280 through the interface cable 282. In addition, using the interface cable and the input panel, most functions of the automobile mobile phone can be used.

An outgoing call can be also made using the automobile mobile phone. In order to provide added convenience, the automobile mobile phone can be operated by pressing buttons which are easily accessible to the driver while driving. For instance, a call button 142, which is used to make or receive a call, can be placed on the steering wheel. Alternatively, it can be placed on the instrument panel. In addition, an on/off button, which is used to end a call, can be placed on the steering wheel (FIG. 23) or the instrument panel. It is noted that in most mobile phones, the on/off button is also used as the power button. For instance, when the user presses the on/off button for a certain period of time, the mobile phone will be turned off. In order to provide more convenience, speech recognition technologies can be used, which eliminate the need for pressing buttons.

The phone bill can be billed to the personal mobile phone or the automobile mobile phone. If there is only one driver, it does not matter whether the phone bill is made to the personal mobile phone or the automobile mobile phone. If there are several drivers, it would be better to send the phone bill to the corresponding personal mobile phone.

It is noted that other types of incoming communication such as textual messages can also be redirected to the automobile mobile phone. Textual messages can be displayed on a display device of the automobile if available. Furthermore, the user can choose the types of incoming communication to be redirected to the automobile mobile phone by sending a textual message to the telephone company system. FIG. 25 illustrates such textual messages. It is noted that the user does not have to type all those texts in FIG. 25. Such textual messages can be sent by pressing a sequence of buttons or special code systems can be used.

Embodiment 2

Figure 9:
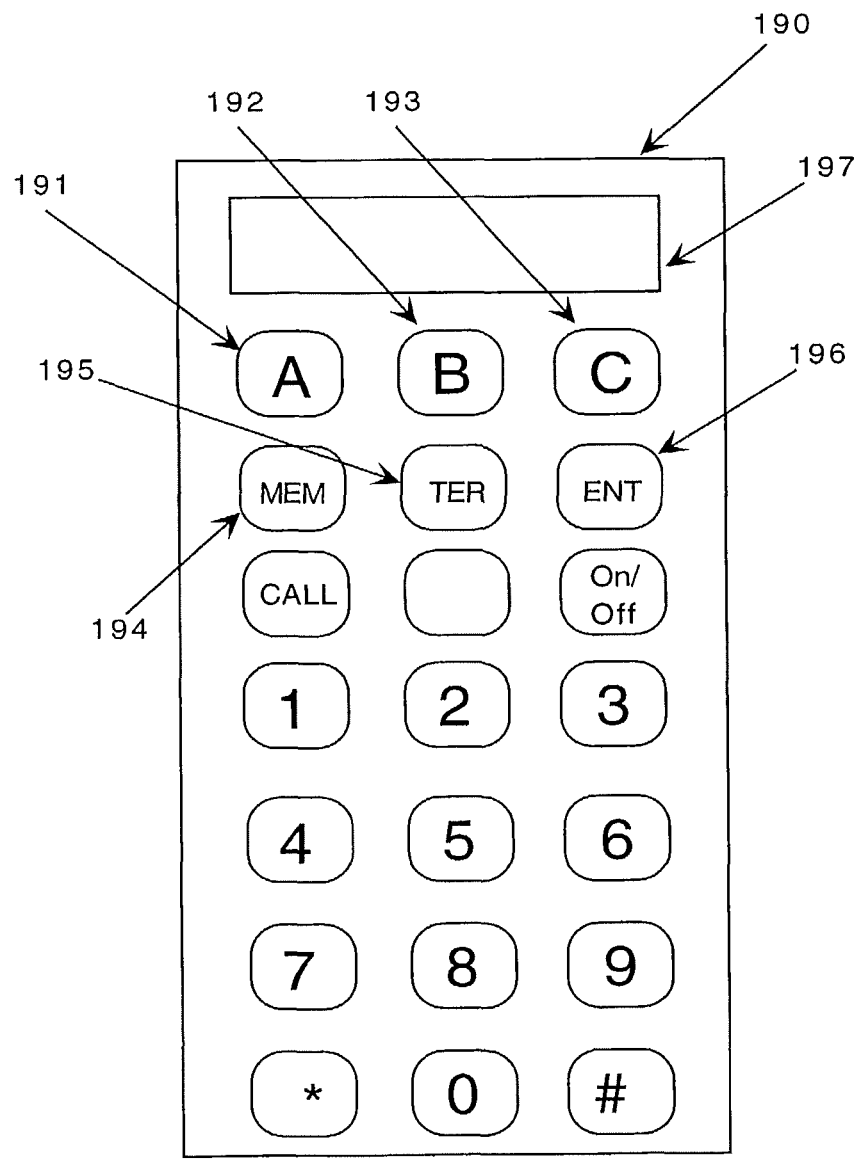
FIG. 9 illustrates an input panel, with which a driver can enter various kinds of information.

Sometimes, more than one driver might drive the same automobile and each driver has his or her own mobile phone. In this case, when the automobile mobile phone installed inside the automobile is turned on and begins sending signals to a base station, the telephone company system cannot know which driver is actually driving the automobile. In order to address this problem, the present invention also provides the automobile mobile phone with identification sending means to send information on the driver to the telephone company system. In other words, when there are several drivers whose telephone numbers are registered with the telephone number of the automobile mobile phone and one of the drivers is going to drive, the driver enters his or her telephone number into the automobile mobile phone using an input panel 190 (FIG. 9). The input panel 281 is connected to the automobile mobile phone 280 through an interface cable 282 and the automobile mobile phone receives the information from the input panel (FIG. 18). Then, the automobile mobile phone transmits this information to the telephone company system. Alternatively, it is also possible to use the automobile mobile phone directly to enter the telephone number of the driver's personal mobile phone. In other words, the automobile mobile phone is installed in such a way that the driver can easily access the buttons on the automobile mobile phone. In this case, one can store the telephone number in the automobile mobile phone and send this information as a textual message to the telephone company system. Furthermore, this information can be sent as a textual message by pressing one memory button. In other words, when a certain button or a sequence of buttons is pressed, a textual message, which is already stored, is sent to the telephone company system. The current mobile phone does not have this kind of functionality. However, according to the idea and teaching of the present invention, future models are designed to have this functionality so that a user can send a textual message, which is stored in memory, by pressing a button or a sequence of buttons.

Figure 10:
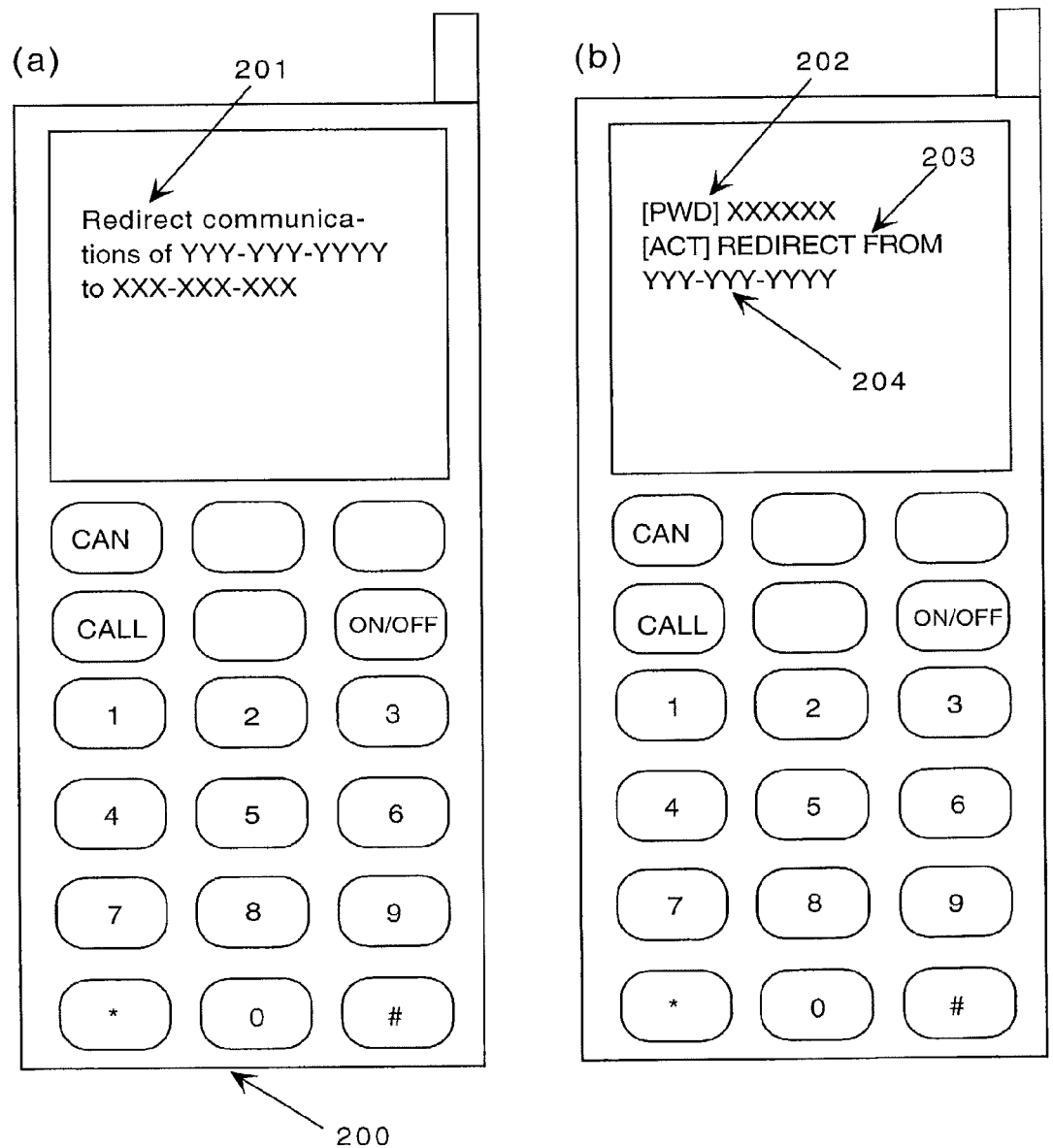
FIG. 10 shows examples of redirection request messages, which are sent from the automobile mobile phone.

As described previously, in order to provide comparability with existing mobile phone technologies, the information on the driver can be sent as a textual message 201 as illustrated in FIG. 10. Then, the telephone company system temporarily registers these two telephone numbers together and uses the automobile mobile to handle all calls directed to the personal mobile phone carried by the driver. For example, if the automobile mobile (XXX-XXX-XXXX) sends a textual message "[redirect from: YYY-YYY-YYYY]" to the telephone company system, the telephone company system handles all communications of YYY-YYY-YYYY using the automobile mobile phone (XXX-XXX-XXXX), until the automobile mobile phone is turned off. It is noted that it is not necessary to send the number of the automobile telephone number since the telephone company system already recognizes it, though the message may include it (FIG. 10*a*).

Sometimes, someone else continues to drive the automobile after the registered user leaves the automobile. In order to handle this circumstance, the input panel also provides an option to terminate the communication redirection. For instance, if the termination button 195 is pressed, the automobile mobile phone sends a textual message, which requests the termination of redirection. In fact, this termination request message is essentially identical to the cancellation message (FIG. 7). Alternatively, the registered user can terminate the redirection by sending a message to the telephone company system from his or her personal mobile phone. As explained previously, this textual information might be also stored and the user can send the textual message by pressing a series of buttons. Furthermore, the telephone company system may terminate the redirection if the user begins to use his or her personal mobile phone by placing a call or receiving incoming calls.

If the driver has to enter his or her telephone number each time the driver gets into the automobile, it is rather inconvenient. Alternatively, the driver can store his or her telephone number in the input panel 190 and use a single button to enter his or her telephone number. For instance, the driver stores his or her telephone number in one of the three store buttons (A 191, B 192, C 193) and presses the button whenever he or she gets into the automobile. The number can be stored using the numerical buttons and control buttons (MEM 194 and ENT 196). The input panel also has a display 197.

It is also possible that the telephone number of a registered user is incorrectly entered by an unauthorized person. In order to prevent this problem, the telephone company system can send a textual message to the personal mobile phone carried by the legitimate user, informing the user that now the automobile mobile phone will handle all incoming calls of the legitimate user (FIGS. 5-6). In addition, the telephone company system also provides an option for the legitimate user to cancel the communication redirection. If the legitimate user chooses the cancellation option, the telephone company system cancels the communication redirection. The cancellation request can also be transmitted by using a textual message (FIG. 7). Furthermore, the telephone company system can provide an option to the legitimate user so that no more communication redirection is allowed on the day (FIG. 7*b*) or until the legitimate user activates the redirection option (FIG. 7*c*). It is noted that all these kinds of communications can be handled by using textual messages, which are already provided by most mobile phone companies.

Figure 19:
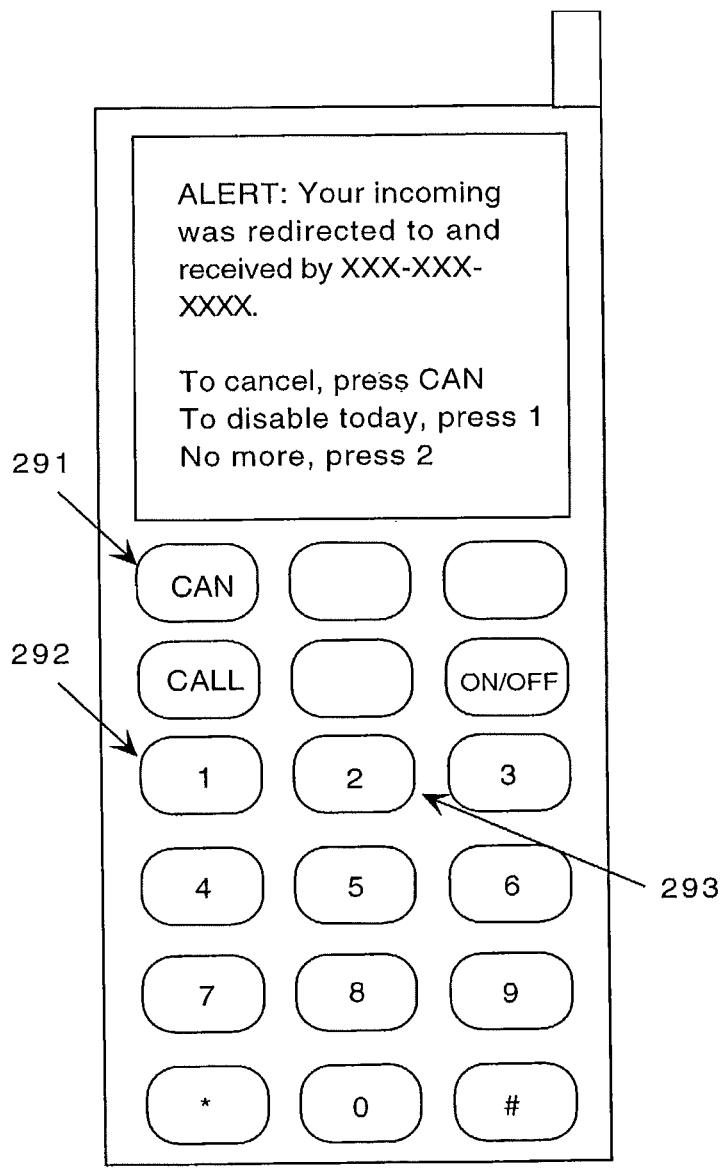
FIG. 19 shows an example of an alert message which warns the registered user that an incoming call was redirected and received by the automobile mobile phone.

In order to prevent an unauthorized user from receiving an incoming call, the telephone company system may send ringing signals to both the automobile mobile phone and the personal mobile phone. In other words, all incoming calls directed to the personal mobile phone will be also duplicated to the automobile mobile phone. The incoming call can be answered either from the automobile mobile phone or the personal mobile phone. If the legitimate user receives the incoming call from the personal mobile phone, the telephone company system assumes that the legitimate user is not driving the automobile and terminates duplicating incoming calls directed to the personal mobile phone to the automobile mobile phone. In order to provide an adequate response time for the legitimate user, the telephone company system may ring first the personal mobile phone and then ring the automobile mobile phone after a delay. During this delay, the legitimate user can accept the incoming call if the legitimate user is not driving the automobile. In order to provide additional assurance, the telephone company system can send a message to the personal mobile phone informing the user that the incoming call was received by the automobile mobile phone (FIG. 19).

It is noted that other types of incoming communication such as textual messages can also be duplicated to the automobile mobile phone. Furthermore, the user can choose the types of incoming communication to be duplicated to the automobile mobile phone by sending a textual message to the telephone company system.

It is also noted that the user can choose whether incoming communication directed to his or her personal mobile phone is redirected or duplicated to the automobile mobile phone by sending a textual message to the telephone company system. FIG. 26 illustrates such textual messages. It is noted that the user does not have to type all those texts in FIG. 26. Such textual messages can be sent by pressing a sequence of buttons or special code systems can be used.

Figure 11:
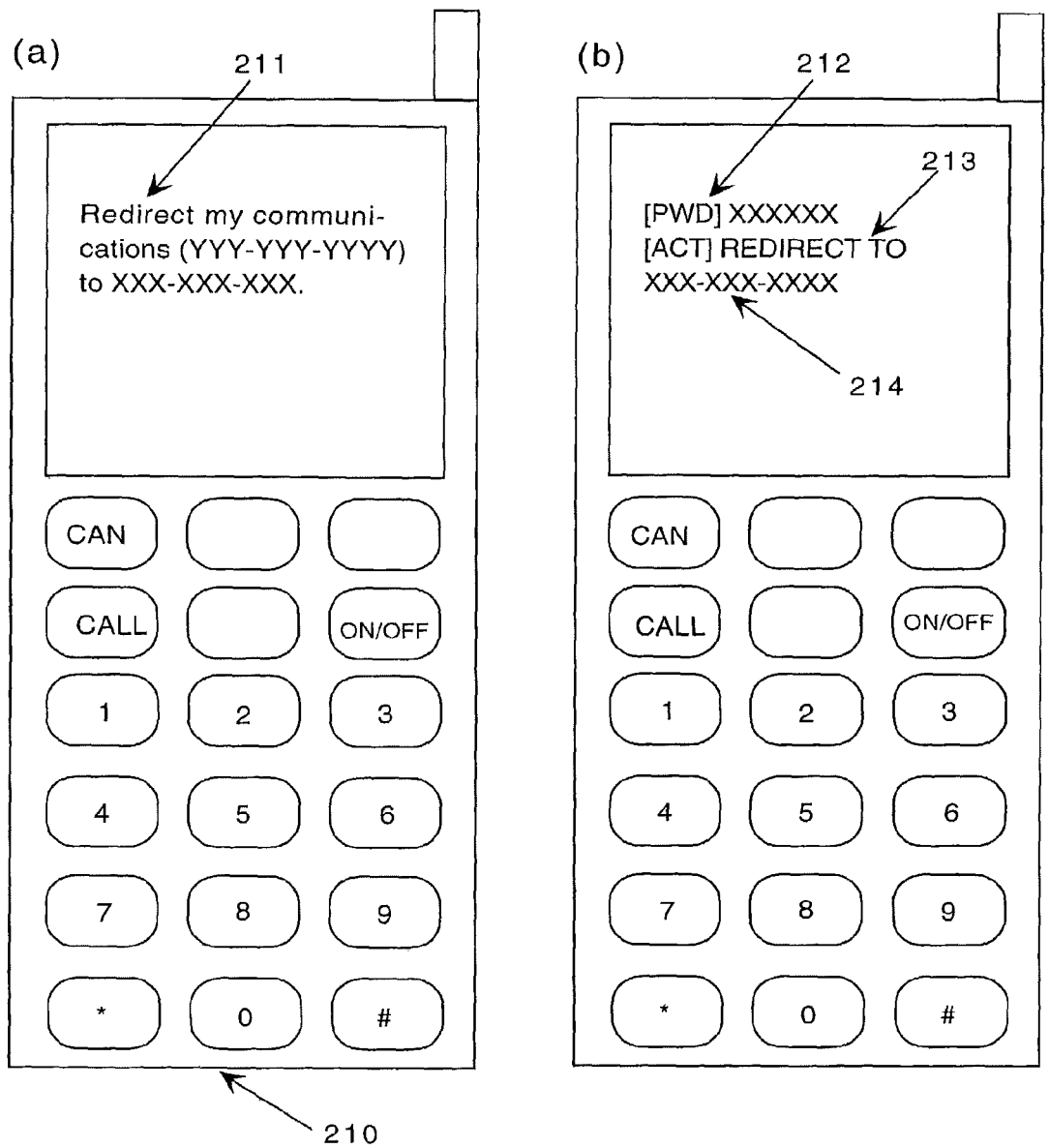
FIG. 11 shows examples of redirection request messages, which are sent from the personal mobile phone.

Alternatively, the driver can request that the telephone company system redirect all incoming calls directed to his or her personal mobile phone to the automobile mobile phone by sending a textual message to the telephone company system by using his or her personal mobile phone. FIG. 11 shows examples of such textual messages. It is also possible to send this request by pressing a single button when the message is stored in memory. In other words, a special message, which requests a certain operation, is stored in memory and the message is transmitted to the telephone company system when a specified button or a sequence of buttons is pressed. An advantage of this redirecting method is that unauthorized redirection can be prevented. It is noted that the redirection will take place when the corresponding automobile mobile phone starts to send signals and the redirection will terminate when the automobile mobile phone is turned off or when a termination request is sent by the user.

According to the idea and teaching of the present invention, there are several termination conditions for communication redirection, which include absence of signals from the automobile mobile phone, a cancellation message from the personal mobile phone, making a call from the personal mobile phone and receiving an incoming call from the personal mobile phone. Furthermore, a user can select termination conditions based on his or her need by sending a textual message to the telephone company system. FIG. 27 illustrates examples of such textual messages. For instance, if FIG. 27a is sent, the communication redirection is terminated when the automobile mobile phone stops sending signals to the telephone company system or when the user sends a cancellation message from his or her personal mobile phone or when the user answers an incoming call from his or her personal mobile phone or when the user makes a call from his or her personal mobile phone. If FIG. 27b is sent, the communication redirection is terminated when the automobile mobile phone stops sending signals to the telephone company system. It is noted that the user does not have to type all those texts in FIG. 27. Such textual messages can be sent by pressing a sequence of buttons or special code systems can be used.

Embodiment 3

Although a number of drivers can use the same automobile mobile phone by using the input panel, it is rather inconvenient to enter the telephone number or press a memory button whenever the driver is going to drive the automobile. In order to address this problem, according to the idea and teaching of the present invention, the telephone number of a driver is stored in the automobile key. When the driver starts the automobile, the information stored in the automobile key is sent to the automobile mobile phone and the automobile mobile phone transmits this information to the telephone company system. As described previously, the information may be sent as a textual information. The transmission of this information from the automobile key to the automobile mobile phone can be made through either a wired connection or wireless connection. In other words, when the driver places the key into the key ignition to start the automobile, the key can send this information through a wired connection since the key is now placed inside the ignition slot. Alternatively, the information can be transferred to the input panel by using wireless communication.

Figure 12:
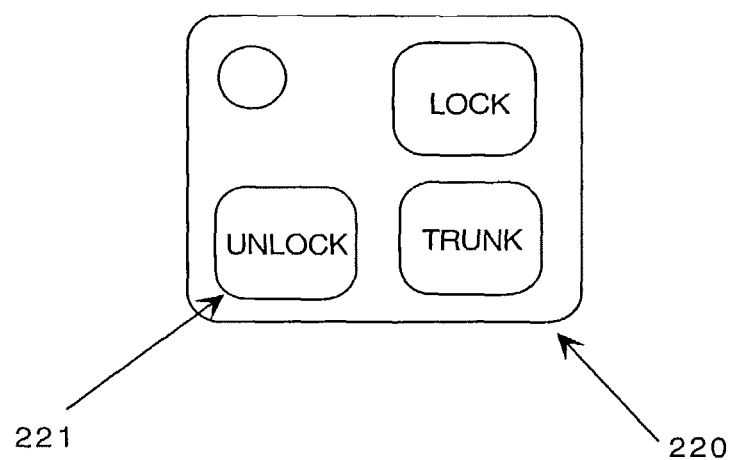
FIG. 12 shows a remote control key, which allows remote keyless entry.
Figure 20:
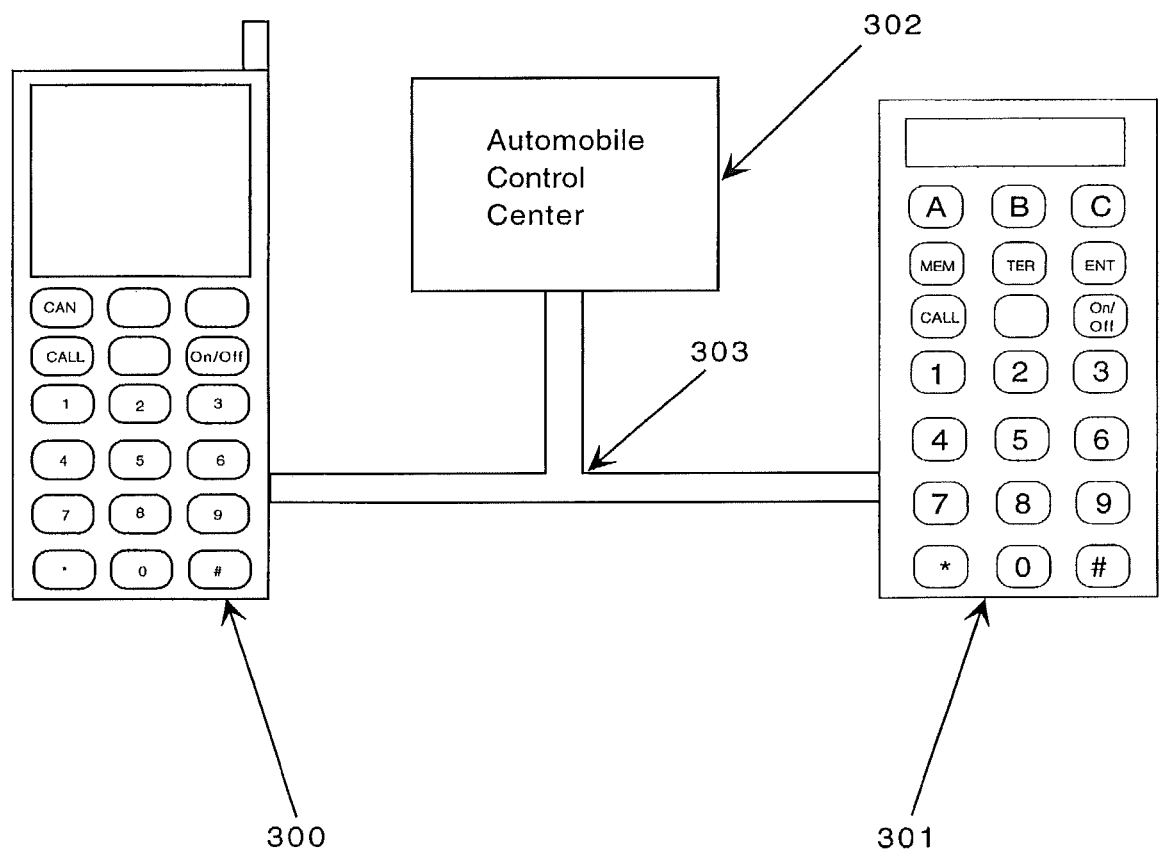
FIG. 20 illustrates the inter-connection among the automobile mobile phone, the input panel and the automobile control center.

Recently, many automobiles are equipped with remote control keys, which allow remote and keyless entry (FIG. 12). In other words, the driver can lock or unlock the automobile using a remote control key 220. Thus, the telephone number of a driver can be also stored in the remote control key. When the driver unlocks the automobile using the remote control key, the remote control key also transmits the telephone number of the personal mobile phone to the automobile. Then, the control system of the automobile transfers this information to the automobile mobile phone. When the driver starts the automobile, the automobile mobile phone transmits this telephone number information to the telephone company system. An advantage of this method is that it can prevent an unauthorized user from entering the telephone number of a legitimate user. FIG. 20 shows an example of the block diagram of the internal connections 303, which interconnect the automobile mobile phone 300, the input panel 301' and the automobile control system 302.

However, it may be difficult to enter a driver's information, which includes the telephone number of the driver's personal mobile phone, into the remote control key. Due to the small size of the remote control key, it is difficult to incorporate input buttons into the remote control key. Furthermore, it is difficult for the automobile manufacturing company to make remote control keys based on potential users. In addition, when the automobile is sold, it is difficult to change the information stored in the remote control key. In order to address this problem, according to the teaching and idea of the present invention, when a set of remote control keys are made for an automobile, each remote control key is assigned a unique code. For instance, if four remote control keys are provided for an automobile, two bits are required to assign a unique identification code to each remote control key (FIG. 13). It is noted that the four remote control keys have the same unlocking signal.

When a driver presses the unlock button 221, the remote control key 220 transmits this unique identification code along with the unlock signal. It is noted that the unlock signal is identical for all remote control keys that belong to the same automobile. Then, the automobile stores this identification code. When the user starts the engine, the automobile turns on the automobile mobile phone by supplying power to the automobile mobile phone and sends the identification code to the automobile mobile phone.

Each driver needs to store his or her identification code along with the telephone number of the personal mobile phone in the automobile mobile phone. Since the automobile mobile phone already has input means such as input buttons, it will be relatively easy to associate each identification code to a telephone number. When the automobile mobile phone receives an identification code from the automobile, it searches its memory and locates the corresponding telephone number of the driver's personal mobile phone. Then, the automobile mobile phone transmits this telephone number to the telephone company system, requesting that all incoming calls directed to the telephone number should be redirected to the automobile mobile phone.

Figure 21:
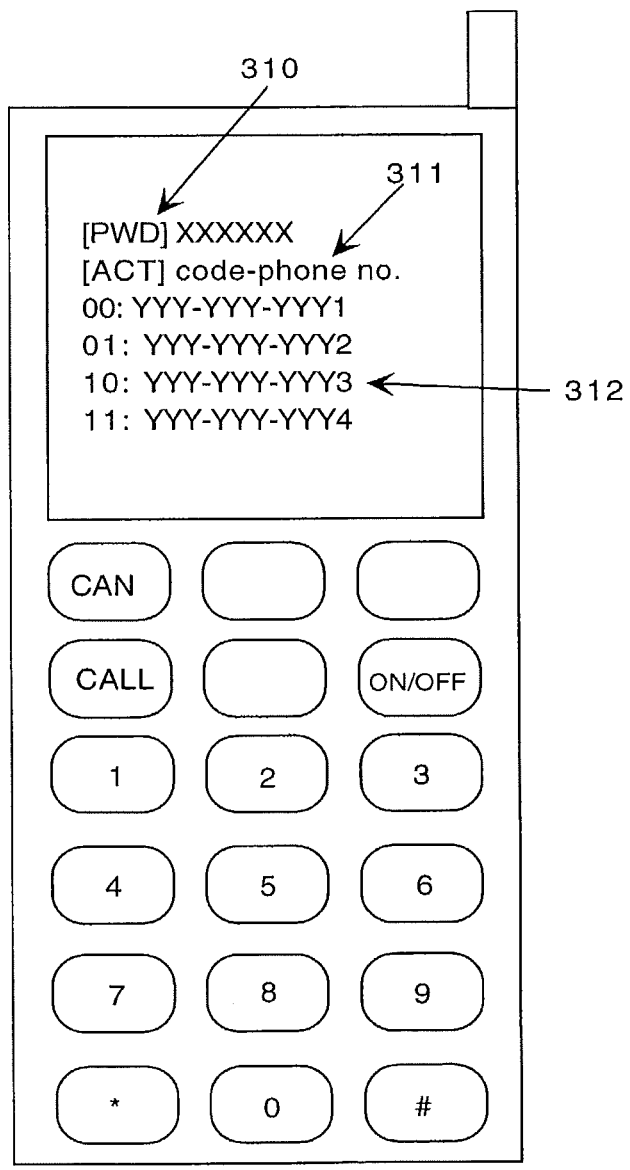
FIG. 21 shows an example of code assignment messages.
Figure 24:
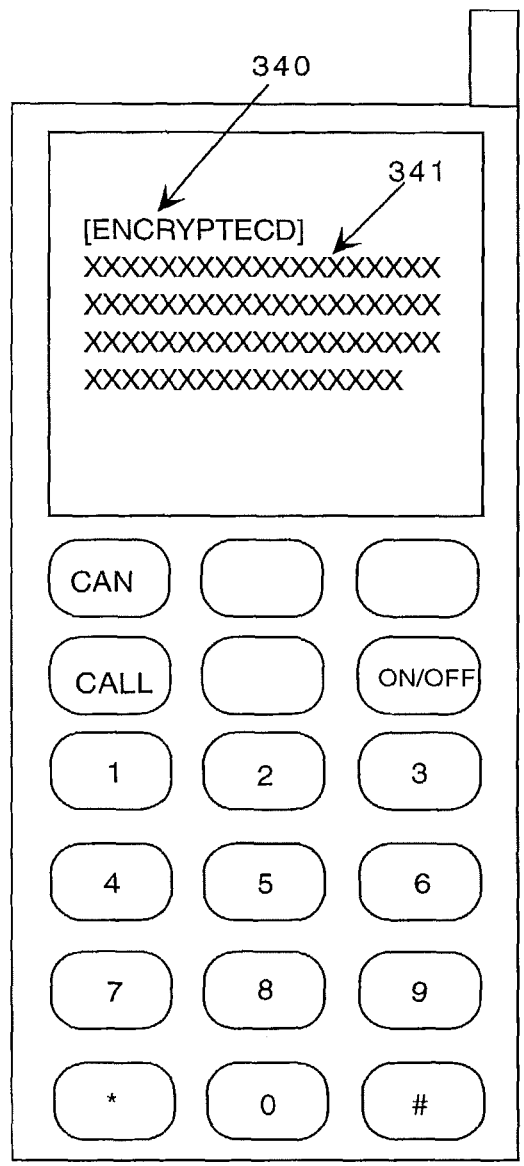
FIG. 24 shows an encrypted message.

Alternatively, in order to store his or her identification code along with the telephone number of the personal mobile phone in the automobile mobile phone, one may use the input panel, which is connected to the automobile mobile phone. It is also possible to enter this kind of information by using a textual message. For instance, the user can send a message such as the one shown in FIG. 21. The message consists of three fields: password 310, action 311, and body 312. The password field is provided to prevent an unauthorized access. The action field specifies an action to be performed. In this case, the action to be performed is to associate identification codes and telephone numbers. The body field provides information which is needed to perform the action. In order to provide increased security, some or all of these fields may be encrypted. In other words, the message can be sent in the format shown in FIG. 24. The leading word 340 indicates that the following message 341 is encrypted. In order to interpret the message, the mobile phone should first decrypt the encrypted message using a specified password, which is also known to the sender. Although current mobile phones do not have this kind of function, future models are designed to have this function according to the idea and teaching of the present invention.

Figure 22:
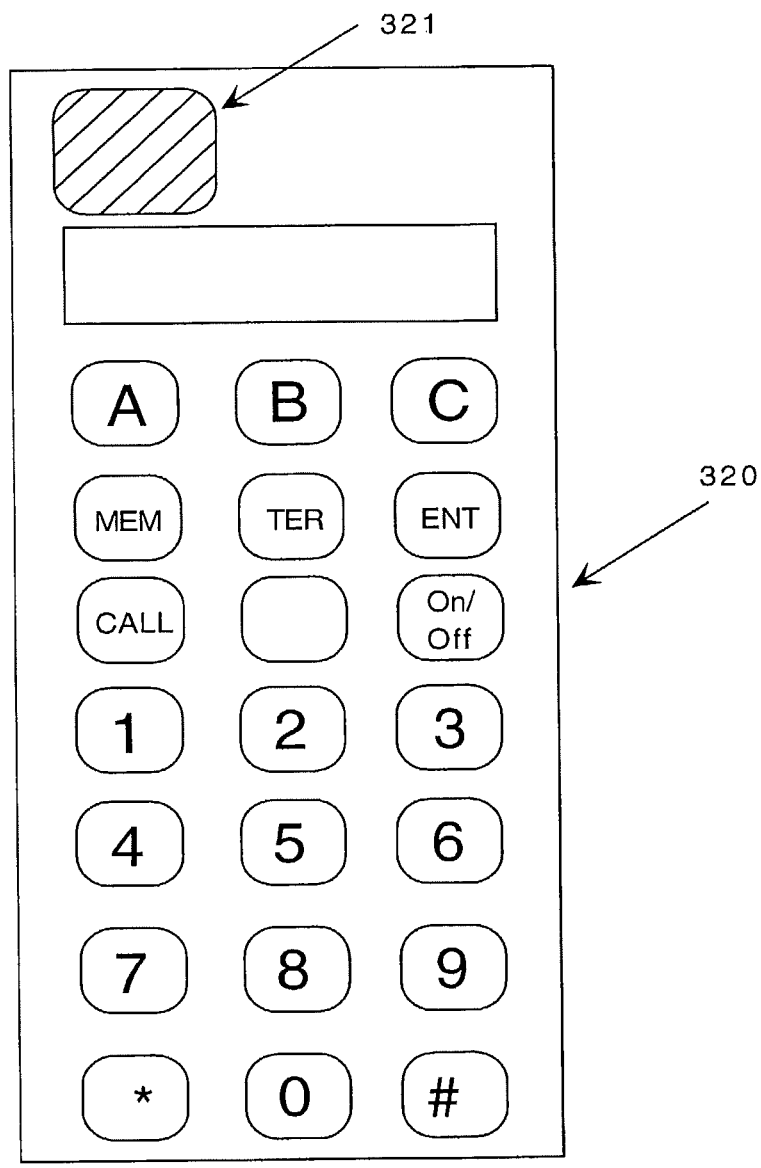
FIG. 22 shows an input panel which has a fingerprint sensor.

In order to discern the identity of the driver, biometrics technology can be used, which include face recognition and fingerprint recognition. For example, the input panel 320 has a fingerprint sensor 321 (FIG. 22). A driver first needs to register his or her fingerprint along with the telephone number of his or her personal mobile phone. This registration can be done using the fingerprint sensor 321 and the input panel 320. Then, whenever the driver is going to drive the automobile, the driver touches the fingerprint sensor and the input panel retrieves the driver's telephone number and transfers it to the automobile mobile phone. It is noted that there are many other biometrics that can be used for driver identification, which include voice and palm print recognition techniques.

Embodiment 4

Sometime, the user may forget to carry his or her personal mobile phone and then get into the automobile. In this case, it would be helpful if the user can use the automobile mobile phone to handle all of his or her communication activities. According to the teaching and idea of the present invention, it will be possible while the user is driving the car. However, it might be better if the user can carry the automobile mobile phone. In order to provide this function, the automobile mobile phone needs to be installed in such a way that it can be removed. However, in order to prevent an unauthorized use, when the automobile mobile phone is removed, the automobile mobile phone sends an alert signal to the telephone company system. Then the telephone company system requests the user to prove his or her identity. For example, the telephone company system may request a password, which the user previously registered with the telephone company system. This kind of communication can be done interactively or done by using textual messages.

This password protection can be used in order to prevent unauthorized usage of the automobile mobile phone. For instance, a potential user may be required to enter a password in order to use the automobile mobile phone.

Embodiment 5

Figure 14:
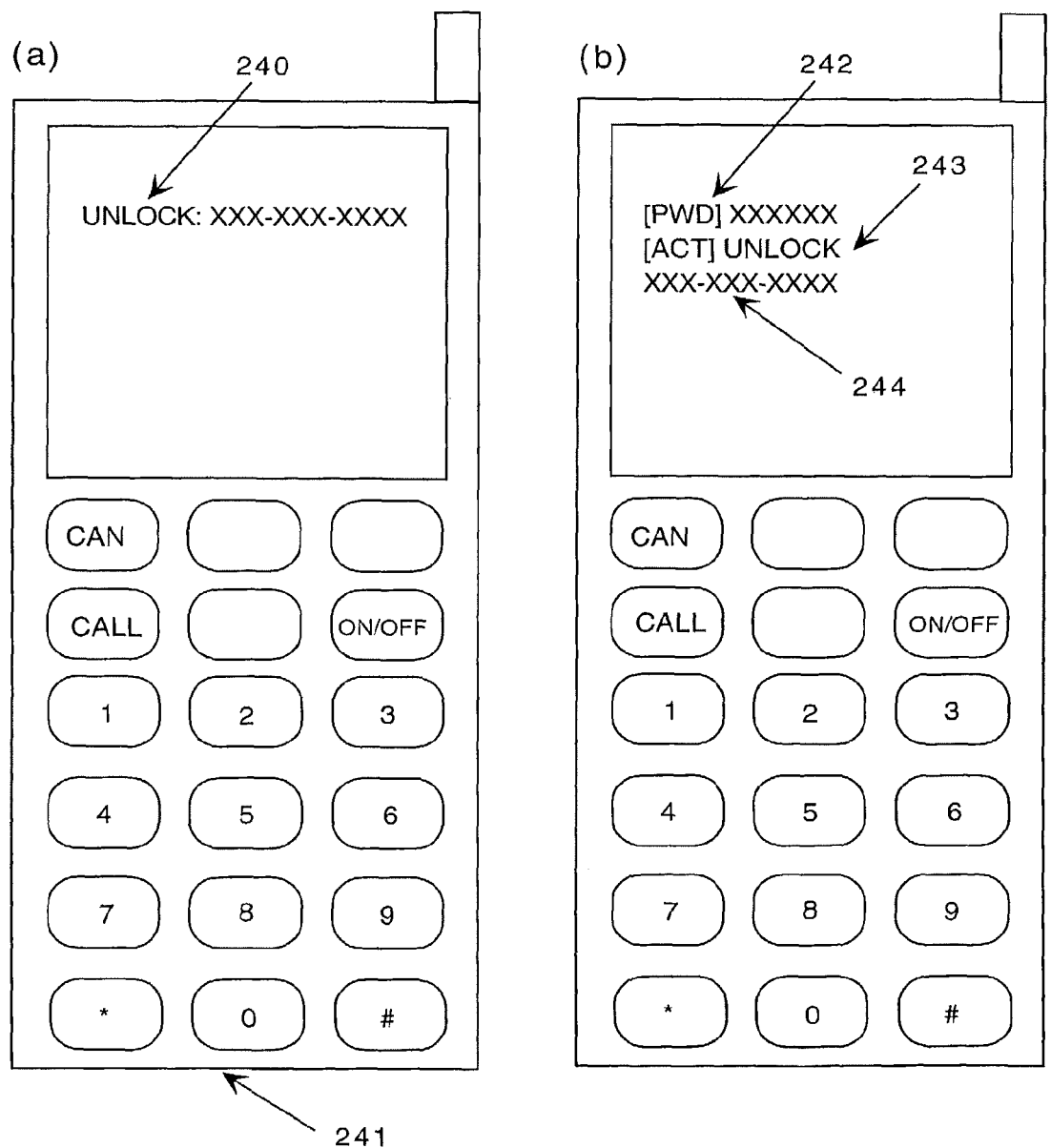
FIG. 14 shows examples of textual messages that direct the automobile to unlock the automobile door.
Figure 15:
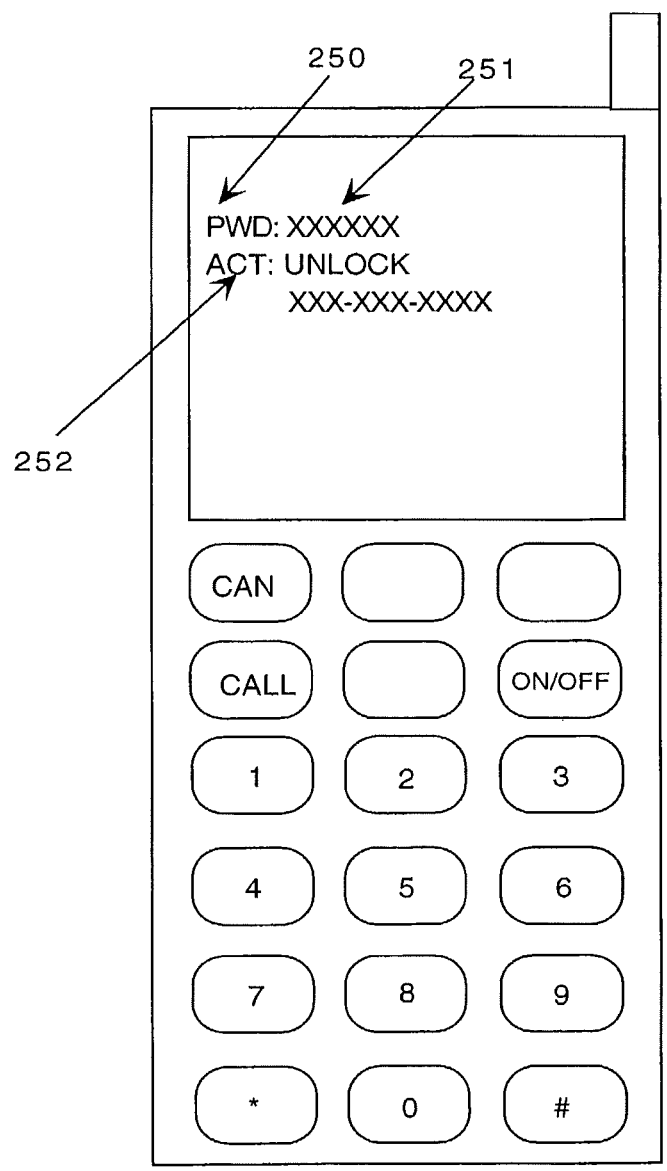
FIG. 15 shows another format of textual messages that direct the automobile to unlock the automobile door.

Since the automobile mobile phone is installed inside the automobile, it can be used for other useful functions. For instance, when the driver is locked out of the automobile, the driver can send a message to the automobile mobile phone requesting the automobile to unlock the door. Since the automobile and the automobile mobile phone are connected, they can exchange signals. FIG. 14a shows an example of such command messages requesting the automobile to unlock the door. The telephone number of the automobile mobile phone (XXX-XXX-XXXX) can be optional. The command message in FIG. 14b comprises three fields: password, action and body. It is noted that there can be many variations of such a message. FIG. 15 shows a different format.

The password prevents unauthorized operation using the automobile mobile phone. In order to provide increased security, the automobile mobile phone can be programmed to take commands only from registered telephone numbers. Furthermore, when the automobile mobile phone is used for this purpose, the automobile mobile phone should be able to receive these messages, even though a user does not answer the automobile mobile phone. In other words, the mobile phone should be able to take messages while it is in stand-by mode without a user answering the mobile phone. Fortunately, most mobile phone companies already provide this kind of message service. In other words, most current mobile phones are able to take messages while they are in stand-by mode.

Thus, according to the idea and teaching of the present invention, when the mobile phone receives a message, it checks whether the message is a command message which directs the mobile phone to perform an operation by examining the format. If the received message is in the command message format such as the one shown in FIG. 14 and the password is correct, the mobile phone performs the operation.

Figure 16:
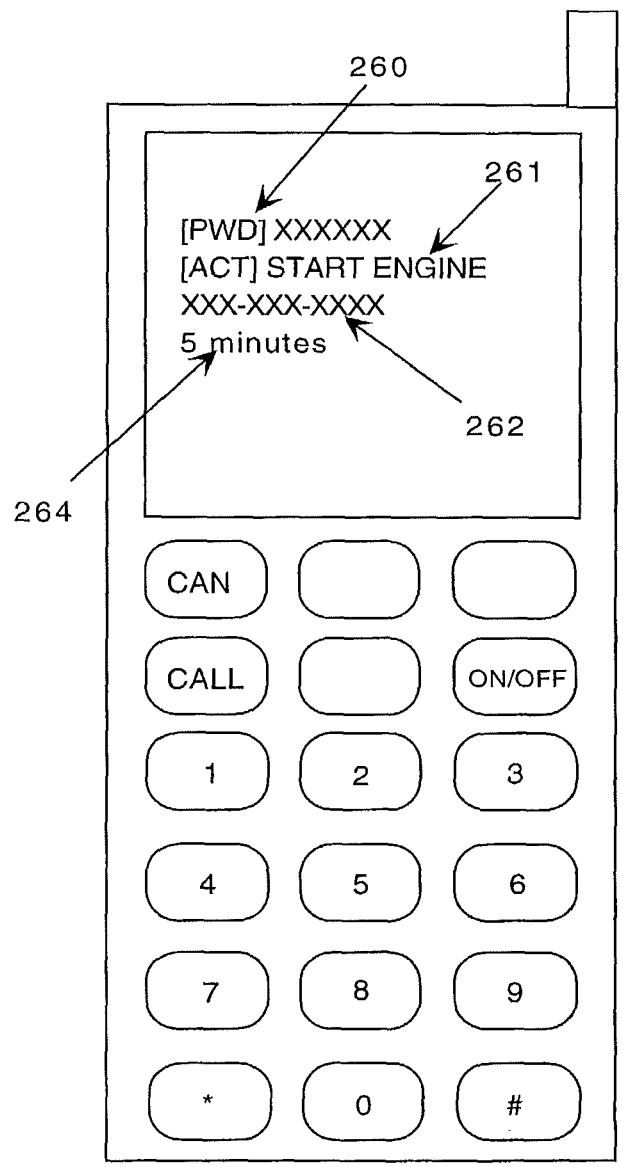
FIG. 16 shows an example of textual messages that direct the automobile to start the engine.
Figure 17:
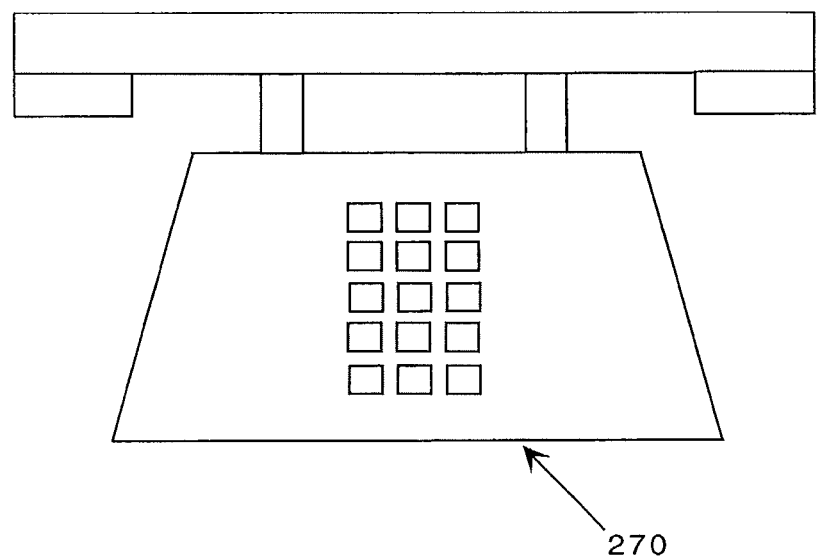
FIG. 17 shows a wired telephone.

In a very cold climate, sometimes it is desirable to idle the automobile for a while in order to warm up the vehicle. The automobile mobile phone can be used to start the engine in such a circumstance. For instance, the driver sends a message to the automobile mobile phone requesting the automobile to start the engine before the driver leaves home. FIG. 16 shows an example of such command messages requesting the automobile to start the engine. The telephone number of the automobile mobile phone (XXX-XXX-XXXX 262) can be optional. Since the driver may be delayed or may not be leaving at all, it is desirable for the automobile to turn itself off after a certain amount time, which can also be set by the driver. For instance, after 5 minutes 264, if the driver does not start driving, the automobile turns itself off.

In this case, the automobile mobile phone needs to be turned on continually and will continually send signals to the telephone company system. Then, the telephone company system may incorrectly assume that the user is driving. Therefore, when the automobile mobile phone is to be also used for this kind of purpose, the telephone company system should not redirect the communications of a personal mobile phone even though the automobile mobile phone sends signals to the telephone company system. Furthermore, there needs to be a way to let the telephone company system know whether the user is actually driving or not. There are a number of ways to determine whether the user is actually driving or not. One possible solution is to detect the presence of the driver. For instance, the driver's seat can be equipped with a sensor, which senses the presence of the driver and sends signals to the automobile mobile phone. Alternatively, the ignition slot can have a sensor. When the automobile key is inserted, the sensor sends signals to the automobile mobile phone. Another possible way to detect whether the automobile is actually being driven is to sense the position of the transmission gear. If the transmission gear is in the parking position, it can be assumed that the automobile is not being driven. It is noted that there are many other possible methods to detect the presence of the driver and any method can be used with the present invention.

When the automobile determines that a driver is present, it notifies the automobile mobile phone that a user is driving the automobile. Then, the automobile mobile phone sends a message to the telephone company system, requesting communication redirection. When the automobile mobile phone is also used for this kind of purpose, the telephone mobile phone redirects communications of the personal mobile phone only when the automobile mobile phone sends a request for communication redirection. For example, the textual message of FIG. 10 can be used to request communication redirection. In this circumstance, the communication redirection should be terminated when the driver stops driving. When the driver-sensing device senses the absence of the driver, this information is sent to the automobile mobile phone. Then, the communication redirection is terminated when the automobile mobile phone sends a textual message such as the one shown in FIG. 7a, requesting the termination of communication redirection.

It is also possible that more than one user can drive the same automobile. All the ideas and teachings in the previous embodiments can be used even when the automobile mobile phone is also used for this purpose.

Embodiment 6

Since a number of users may use the same automobile mobile phone when they drive the automobile, it is desirable that the telephone company system should bill them according to their usage. This can be easily done since the automobile mobile phone is associated with one personal mobile phone at a time, even though a number of users may drive the automobile. Therefore, the telephone company system can easily identify the user of the automobile mobile phone and bill the appropriate user accordingly.

Embodiment 7

The idea and teaching of the present invention can be further extended to wired phone systems. In other words, the personal mobile phone can be associated with a wired phone. For instance, a user, who receives a large number of incoming calls from his or her personal mobile phone, is going to stay in the office for awhile. If a user wants to receive all incoming calls directed to the personal mobile phone using a wired telephone 270, the user sends a redirection request to the telephone company system. This request can be sent from the personal mobile phone or a wired telephone. Then, the telephone company system redirects all incoming calls of the personal mobile phone of the user to the wired phone. When the user wants to terminate the redirection, the user can send a cancellation request to the telephone company system either through the wired phone or the personal mobile phone. Alternatively, when the user makes a call from the personal mobile phone or receives an incoming call from the personal mobile phone, the telephone company system immediately terminates the redirection.

It is noted that most features of the embodiments with the automobile mobile phone can be also applied to a wired phone.

Embodiment 8

Figure 23:
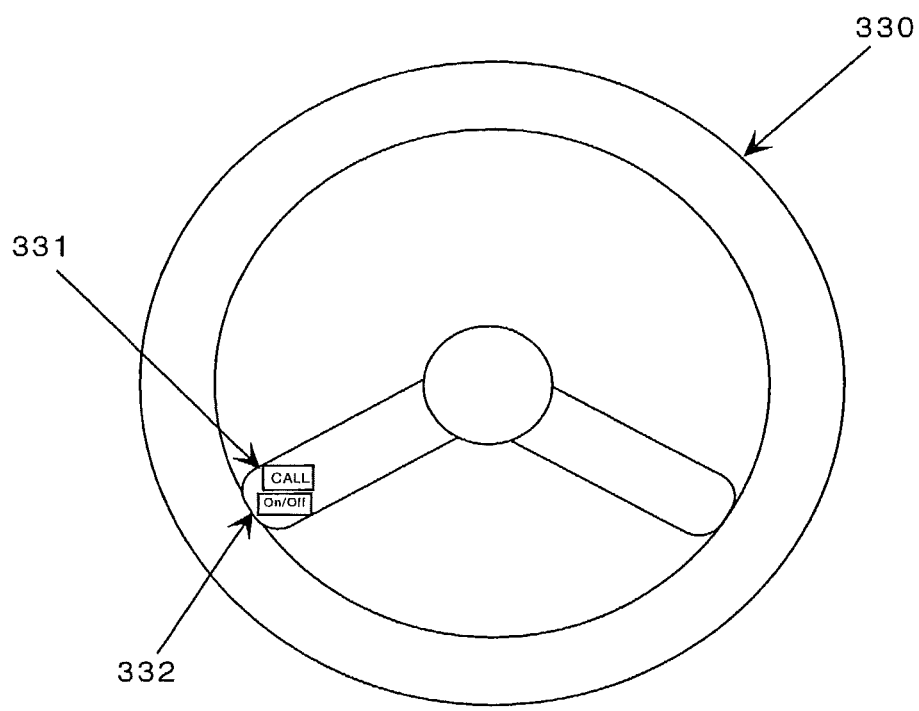
FIG. 23 shows a steering wheel which has the call and on/off buttons.

According to the idea and teaching of the present invention, basic buttons which are needed to operate the automobile mobile phone are placed in a place so that the driver can easily access them while driving. For instance, they can be placed on the steering wheel or on the instrument panel. For instance, a call button 331, which is used to answer or make a call, can be installed on the steering wheel 330 (FIG. 23). In addition, an on/off button 332, which is used to end a call, is also placed on the steering wheel 330. Alternatively, they can be place on the front instrument panel. The input panel is also located in a place so that the driver can easily access them while driving. For instance, it can be located on the instrument panel.

Furthermore, in order to provide privacy when there are passengers in the automobile, the external speaker for the automobile mobile phone may be installed in such a way that the sound is audible only to the driver. For instance, a directional external speaker 140 can be located on the bulkhead next to the ear of the driver (FIG. 4) and a microphone 141 is located close to the mouth of the driver. In addition, the speaker can have an ear location sensor so that it always directs to the ear of the driver. The microphone can have a mouth location sensor so that it always directs to the mouth of the driver.

Embodiment 9

When a driver is driving an automobile and the automobile mobile phone is handling the incoming communication of the driver's personal mobile phone, it would be helpful if the automobile mobile phone has the information stored in the driver's personal mobile phone, which includes the personal phone book, recent talk records, and diary. Thus, according to the idea and teaching of the present invention, when the telephone company system is about to redirect incoming communication directed to the driver's personal mobile phone to the automobile mobile phone, the telephone company system requests the driver's personal mobile phone to transmit such information and the driver's personal mobile phone transmits the information to the telephone company system. Then, the telephone company system transmits the information to the automobile mobile phone. In order to provide increased security, the information might be encrypted or password checking can be used. Furthermore, the automobile mobile phone can be programmed to delete the information when the redirection is terminated.

I claim:

1. A mobile communication system comprising:
   means for registering a personal mobile terminal and a vehicle mobile terminal for approved association;
   means for redirecting incoming communication originally directed to the personal mobile terminal to the vehicle mobile terminal when said personal mobile terminal and said vehicle mobile terminal have been approved for association, wherein the mobile communications system receives signals from the vehicle mobile terminal while said vehicle mobile terminal is turned on, said signals from the vehicle mobile terminal initiating the redirection of communications from the personal mobile terminal to the vehicle mobile terminal regardless of the status or location of the personal mobile terminal; and
   means for terminating the redirecting of incoming communication when the vehicle mobile terminal stops sending signals to the mobile communication system,
   wherein said personal mobile terminal and said vehicle mobile terminal are in a vehicle, wherein said vehicle mobile terminal remains turned off when power is not supplied through a power cord and is automatically when power is supplied through said power cord when said vehicle is started, such that said vehicle mobile terminal starts sending signals to said mobile communications system when the vehicle is turned on.

2. A mobile communication system comprising:
   means for redirecting incoming communication originally directed to a personal mobile terminal to a vehicle mobile terminal regardless of the status or location of the personal mobile terminal, wherein the means for redirecting receives an initiating message from the vehicle mobile terminal and thereafter begins redirecting incoming communications originally directed to the personal mobile terminal to the vehicle mobile terminal; and
   means for terminating the redirecting of incoming communication wherein the means for terminating receives a termination message from the vehicle mobile terminal,
   wherein said personal mobile terminal and said vehicle mobile terminal are in a vehicle, wherein said vehicle mobile terminal remains turned off when power is not supplied through a power cord and is automatically turned on when power is supplied through said power cord when said vehicle is started, such that said vehicle mobile terminal starts sending signals to said mobile communications system when the vehicle is turned on.

3. A mobile communication system comprising:
   means for registering a personal mobile terminal and a vehicle mobile terminal for approved association;
   means for duplicating incoming communication directed to the personal mobile terminal to the vehicle mobile terminal when said personal mobile terminal and said vehicle mobile terminal have been approved for association, wherein mobile communications system receives signals from the vehicle mobile terminal while said vehicle mobile terminal is turned on, said signals from the vehicle mobile terminal initiating the duplication of communications to the vehicle mobile terminal regardless of the status or location of the personal mobile terminal; and
   means for terminating the duplicating of incoming communication when the mobile communication system stops receiving signals from the vehicle mobile terminal, wherein said personal mobile terminal and said vehicle mobile terminal are in a vehicle, wherein said vehicle mobile terminal remains turned off when power is not supplied through a power cord and is automatically turned on when power is supplied through said power cord when said vehicle is started, such that said vehicle mobile terminal starts sending signals to said mobile communications system when the vehicle is turned on.

4. A mobile communication system comprising:
   initiating means for directing a telephone company system to duplicate incoming communication directed to a personal mobile terminal to a vehicle mobile terminal regardless of the status or location of said personal mobile terminal, wherein the initiating means sends an initiating message to the telephone company system; and
   terminating means for directing the telephone company system to terminate duplicating incoming communication directed to said personal mobile terminal to said vehicle mobile terminal wherein the terminating means sends a terminating message to the telephone company system,
   wherein said personal mobile terminal and said vehicle mobile terminal are in a vehicle, wherein said vehicle mobile terminal remains turned off when power is not supplied through a power cord and is automatically turned on when power is supplied through said power cord when said vehicle is started, such that said vehicle mobile terminal starts sending signals to said telephone company system when the vehicle is turned on.

5. The mobile communication system in accordance with claim 4, wherein said telephone company system duplicates incoming communication directed to said personal mobile terminal to said vehicle mobile terminal when said telephone company system receives said initiating message and terminates duplicating incoming communication directed to said primary mobile terminal to said secondary mobile terminal when said telephone company system receives said terminating message.

6. A mobile communication method comprising the steps of:
   redirecting incoming communication directed to a personal mobile terminal to a vehicle mobile terminal regardless of the status or location of the personal mobile terminal, wherein the redirecting is initiated when a telephone company system receives an initiating signal which contains authorization to associate the personal mobile terminal to the vehicle mobile terminal from the vehicle mobile terminal; and
   terminating the redirecting incoming communication when the telephone company system receives a terminating signal,
   wherein said personal mobile terminal and said vehicle mobile terminal are in a vehicle, wherein said vehicle mobile terminal remains turned off when power is not supplied through a power cord and is automatically turned on when power is supplied through said power cord when said vehicle is started, such that said vehicle mobile terminal starts sending signals to said telephone company system when the vehicle is turned on.

7. The mobile communication method in accordance with claim 6, wherein the initiating signal is signals transmitted from the vehicle mobile terminal to the telephone company system when the vehicle mobile terminal is turned on and the redirecting incoming communication is terminated when the vehicle mobile terminal stops sending signals to the telephone company system.

8. The mobile communication method in accordance with claim 6, wherein the initiating signal is an initiating message to the telephone company system and the terminating signal is a terminating message to the telephone company system.

9. A hands-free mobile communication system, comprising:
a vehicle mobile terminal which is installed in a vehicle wherein the vehicle mobile terminal transmits an initiating signal to a telephone company system for redirecting incoming communication directed to one of a plurality of personal mobile terminals to the vehicle mobile terminal regardless of the status or location of said one of a plurality of personal mobile terminals;
a power cord through which power is supplied to said vehicle mobile terminal from a power source of said vehicle when said vehicle is operated; and
means for transmitting identification information of a driver's personal mobile terminal for registering approved association of the personal mobile terminal with the vehicle mobile terminal to the telephone company system wherein the identification information includes a telephone number of said driver's personal mobile terminal,
wherein said personal mobile terminal is also in the vehicle, wherein said vehicle mobile terminal remains turned off when power is not supplied through said power cord and is automatically turned on when power is supplied through said power cord when said vehicle is started, such that said vehicle mobile terminal starts sending signals to said telephone company system when the vehicle is turned on.

10. The hands-free mobile communication system in accordance with claim 9, wherein said vehicle mobile terminal remains turned off when power is not supplied through said power cord, is automatically turned on when power is supplied through said power cord when said vehicle is started, and starts sending signals to said telephone company system.

11. The hands-free mobile communication system claim 9, wherein said vehicle supplies power to said vehicle mobile terminal and transfers said identification information to said vehicle mobile terminal when said vehicle is operated, and then said vehicle mobile terminal transmits said identification information to said telephone company system.

12. The hands-free mobile communication system in accordance with claim 9, wherein said telephone company system redirects incoming calls directed to said driver's personal mobile terminal to said vehicle mobile terminal when said vehicle mobile terminal transmits said identification information to said telephone company system, and terminates redirecting incoming calls directed to said driver's personal mobile terminal to said vehicle mobile terminal when said vehicle mobile terminal stops sending signals to said telephone company system.

13. The hands-free mobile communication system in accordance with claim 9, further comprising:
alerting means which alerts said driver that all incoming calls directed to said driver's personal mobile terminal are going to be redirected to said vehicle mobile terminal, comprising an alert message; and
cancellation means with which said driver is able to cancel communication redirection, comprising a cancellation message via said personal mobile terminal.

14. The hands-free mobile communication system in accordance with claim 13, wherein said vehicle mobile terminal remains turned off when power is not supplied through said power cord, is automatically turned on when power is supplied through said power cord when said vehicle is started, and starts sending signals to said telephone company system.

15. The hands-free mobile communication system in accordance with claim 13, wherein said vehicle supplies power to said vehicle mobile terminal and transfers said information on said driver's personal mobile terminal from said driver identification means to said vehicle mobile terminal when said vehicle is operated, and then said vehicle mobile terminal transmits said information on said driver's personal mobile terminal to said telephone company system.

16. The hands-free mobile communication system in accordance with claim 13, wherein said telephone company system notifies said driver's personal mobile terminal that all incoming calls directed to said driver's personal mobile terminal are going to be redirected to said vehicle mobile terminal when said vehicle mobile terminal transmits said information on said driver's personal mobile terminal to said telephone company system, redirects incoming calls directed to said driver's personal mobile terminal to said vehicle mobile terminal, and terminates redirecting incoming calls directed to said driver's personal mobile terminal to said vehicle mobile terminal when said vehicle mobile terminal stops sending signals to said telephone company system or when said driver sends said cancellation message from said driver's personal mobile terminal.

17. A hands-free mobile communication system, comprising:
a vehicle mobile terminal which is installed in a vehicle;
a power cord through which power is supplied to said vehicle mobile terminal from a power source of said vehicle when said vehicle is operated, wherein said vehicle mobile terminal remains turned off when power is not supplied through said power cord and is automatically turned on when power is supplied through said power cord when said vehicle is started;
a microphone which is installed in said vehicle;
a speaker which is installed in said vehicle;
connecting means by which said vehicle mobile terminal is connected to said microphone and said speaker;
driver identification means with which a driver is able to provide information on a driver's personal mobile terminal which includes the telephone number of said driver's personal mobile terminal for use in registering approved association of the personal mobile terminal with the vehicle mobile terminal, comprising a display unit and a key board which includes numerical keys, an enter key, a store key and memory keys;
audio signal control means;
alerting means which alerts said driver that all incoming calls directed to said driver's personal mobile terminal are going to be redirected to said vehicle mobile terminal regardless of the status or location of the driver's personal mobile terminal, comprising an alert message; and
cancellation means with which said driver is able to cancel communication redirection, comprising a cancellation message,
wherein said vehicle mobile terminal starts sending signals to initiate redirection of calls from said driver's personal mobile terminal to said vehicle mobile terminal when the vehicle is turned on.

18. The hands-free mobile communication system in accordance with claim 17, wherein said vehicle mobile terminal remains turned off when power is not supplied through said power cord, is automatically turned on when power is supplied through said power cord when said vehicle is started, and starts sending signals to a telephone company system.

19. The hands-free mobile communication system in accordance with claim 17, wherein said vehicle supplies power to said vehicle mobile terminal and transfers said information on said driver's personal mobile terminal from said driver identification means to said vehicle mobile terminal when said vehicle is operated, and then said vehicle mobile terminal transmits said information on said driver's personal mobile terminal to a telephone company system.

20. The hands-free mobile communication system in accordance with claim 17, wherein said telephone company system notifies said driver's personal mobile terminal that all incoming calls directed to said driver's personal mobile terminal will be also duplicated to said vehicle mobile terminal when said vehicle mobile terminal transmits said information on said driver's personal mobile terminal to said telephone company system, sends ringing signals to both said driver's personal mobile terminal and said vehicle mobile terminal when there is an incoming call directed to said driver's personal mobile terminal, and terminates duplicating incoming calls directed to said driver's personal mobile terminal to said vehicle mobile terminal when said vehicle mobile terminal stops sending signals to a telephone company system or when said driver sends said cancellation message from said driver's personal mobile terminal or when said driver answers an incoming call directed to said driver's personal mobile terminal from said driver's personal mobile terminal or when said driver makes a call from said driver's personal mobile terminal.

21. A hands-free mobile communication system, comprising:
a vehicle mobile terminal which is installed in a vehicle;
a power cord through which power is supplied to said vehicle mobile terminal from a power source of said vehicle when said vehicle is operated, wherein said vehicle mobile terminal remains turned off when power is not supplied through said power cord and is automatically turned on when power is supplied through said power cord when said vehicle is started;
a microphone which is installed in said vehicle;
a speaker which is installed in said vehicle;
connecting means by which said vehicle mobile terminal is connected to said microphone and said speaker;
a plurality of automatic driver identification means with which a driver is able to provide information on a driver's personal mobile terminal among a plurality of personal mobile terminals associated with a plurality of drivers, which includes the telephone number of said driver's personal mobile terminal, comprising a remote control key;
duplication selecting means with which said driver is able to request a telephone company system to send ringing signals to both said driver's personal mobile terminal and said vehicle mobile terminal when there is an incoming call directed to said driver's personal mobile terminal regardless of the status or location of the driver's personal mobile terminal;
audio signal control means;
alerting means which alerts said driver that all incoming calls directed to said driver's personal mobile terminal are going to be redirected to said vehicle mobile terminal, comprising an alert message; and
cancellation means with which said driver is able to cancel communication redirection, comprising a cancellation message,
wherein said vehicle mobile terminal starts sending signals to initiate duplication of calls when the vehicle is turned on.

22. The hands-free mobile communication system in accordance with claim 21, wherein said remote control key sends a unique identification code, which is uniquely assigned to each driver, to said vehicle when said driver uses said driver's remote control key.

23. The hands-free mobile communication system in accordance with claim 21, wherein said vehicle mobile terminal remains turned off when power is not supplied through said power cord, is automatically turned on when power is supplied through said power cord when said vehicle is started, and starts sending signals to said telephone company system.

24. The hands-free mobile communication system in accordance with claim 21, wherein said vehicle supplies power to said vehicle mobile terminal, transfers said unique identification code sent from said driver's remote control key to said vehicle mobile terminal when said vehicle is operated, and then said vehicle mobile terminal transmits said driver's telephone number, which is obtained using said unique identification code, to said telephone company system.

25. The hands-free mobile communication system in accordance with claim 21, wherein said telephone company system redirects incoming calls directed to said driver's personal mobile terminal to said vehicle mobile terminal when said vehicle mobile terminal transmits said driver's telephone number to said telephone company system, and terminates redirecting incoming calls directed to said driver's personal mobile terminal to said vehicle mobile terminal when said vehicle mobile terminal stops sending signals to said telephone company system or when said driver sends said cancellation message from said driver's personal mobile terminal or when said driver answers an incoming call directed to said driver's personal mobile terminal from said driver's personal mobile terminal or when said driver makes a call from said driver's personal mobile terminal.

26. A hands-free mobile communication system, comprising:
a vehicle mobile terminal which is installed in a vehicle;
a power cord through which power is supplied to said vehicle mobile terminal from a power source of said vehicle when said vehicle is operated, wherein said vehicle mobile terminal remains turned off when power is not supplied through said power cord and is automatically turned on when power is supplied through said power cord when said vehicle is started;
a microphone which is installed in said vehicle;
a speaker which is installed in said vehicle;
connecting means by which said vehicle mobile terminal is connected to said microphone and said speaker;
driver identification means with which a driver is able to provide information on a driver's personal mobile terminal among a plurality of personal mobile terminals associated with a plurality of drivers, comprising a driver identification system using biometrics;
duplication selecting means with which said driver is able to request a telephone company system to send ringing signals to both said driver's personal mobile terminal and said vehicle mobile terminal when there is an incoming call directed to said driver's personal mobile terminal, regardless of the status or location of the driver's personal mobile terminal;
alerting means which alerts said driver that all incoming calls directed to said driver's personal mobile terminal are going to be redirected to said vehicle mobile terminal, comprising an alert message; and
cancellation means with which said driver is able to cancel communication redirection, comprising a cancellation message,
wherein said vehicle mobile terminal starts sending signals to initiate duplication of calls when the vehicle is turned on.

27. The hands-free mobile communication system in accordance with claim 26, wherein said vehicle mobile terminal remains turned off when power is not supplied through said power cord, is automatically turned on when power is supplied through said power cord when said vehicle is started, and starts sending signals to said telephone company system.

28. The hands-free mobile communication system in accordance with claim 26, wherein said vehicle supplies power to said vehicle mobile terminal transfers said information on said driver's personal mobile terminal from said driver identification means to said vehicle mobile terminal when said vehicle is operated, and then said vehicle mobile terminal transmits said driver's telephone number, which is obtained using said information on said driver's personal mobile terminal, to said telephone company system.

29. The hands-free mobile communication system in accordance with claim 26, wherein said telephone company system redirects incoming calls directed to said driver's personal mobile terminal to said vehicle mobile terminal when said vehicle mobile terminal transmits said driver's telephone number to said telephone company system, and terminates redirecting incoming calls directed to said driver's personal mobile terminal to said vehicle mobile terminal when said vehicle mobile terminal stops sending signals to said telephone company system or when said driver sends said cancellation message from said driver's personal mobile terminal or when said driver answers an incoming call directed to said driver's personal mobile terminal from said driver's personal mobile terminal or when said driver makes a call from said driver's personal mobile terminal.

\* \* \* \* \*